US00RE36880E

United States Patent [19]

Pringle

[11] E Patent Number: Re. 36,880

[45] Reissued Date of Patent: Sep. 26, 2000

[54] SPOOLABLE FLEXIBLE HYDRAULIC CONTROLLED COILED TUBING SAFETY VALVE

[75] Inventor: Ronald E. Pringle, Houston, Tex.

[73] Assignee: Camco International Inc., Houston, Tex.

[21] Appl. No.: 08/874,298

[22] Filed: Jun. 13, 1997

Related U.S. Patent Documents

Reissue of:

[64] Patent No.: 5,423,383
Issued: Jun. 13, 1995
Appl. No.: 08/278,284
Filed: Sep. 6, 1994

U.S. Applications:

[62] Division of application No. 08/146,344, Nov. 1, 1993, Pat. No. 5,411,085.

[51] Int. Cl.[7] ..... E21B 34/10

[52] U.S. Cl. ..... 166/321

[58] Field of Search ..... 166/321, 319, 166/332.1, 332.8

[56] References Cited

U.S. PATENT DOCUMENTS

| | | | |
|---|---|---|---|
| 4,844,166 | 7/1989 | Going, III et al. | 166/379 |
| 4,928,772 | 5/1990 | Hopmann | 166/386 |
| 5,012,871 | 5/1991 | Pleasants et al. | 166/386 |
| 5,285,850 | 2/1994 | Bayh, III | 166/321 |

*Primary Examiner*—Hoang C. Dang
*Attorney, Agent, or Firm*—Tobor, Goldstein & Healey, LLP

[57] ABSTRACT

A coiled tubing completion system is provided with a plurality of completion apparatus, all of which is designed flush with the diameter of the coiled tubing outside diameter for avoiding upsets and are flexible, spoolable on a coiled tubing reel and having through bores large enough to pass wireline tools for performing other operations. The spoolable coiled tubing system may use standard coiled tubing well control equipment and can be used in live wells. The flush, flexible, spoolable and through bore completion equipment may include a tubing retrievable safety valve, an annular control valve, concentric gas lift valves, a zone packer, a landing nipple, a sliding sleeve, and may include at the end a non-flexible but flush and open bore production packer and pump out plug. The completion system may be retrieved through a retrieval system.

6 Claims, 24 Drawing Sheets

27a
29a
38a
38a
39
26a
44a
37a
42a
34a

SPOOLABLE FLEXIBLE HYDRAULIC CONTROLLED COILED TUBING SAFETY VALVE

Matter enclosed in heavy brackets [ ] appears in the original patent but forms no part of this reissue specification; matter printed in italics indicates the additions made by reissue.

This application is a division of application Ser. No. 08/146,344, Nov. 1, 1993, *now U.S. Pat. No. 5,411,085*.

BACKGROUND OF THE INVENTION

The present invention is directed to a method and apparatus for completion or recompletion of oil and/or gas wells with spoolable, flexible coiled tubing and retrieving the same.

In place of conventional drilling rigs or workover rigs, completions or recompletions of conventional oil and gas wells by coiled tubing have been disclosed in U.S. Pat No. 4,844,166. However, the various completion equipment utilized, such as safety valves, gas lift mandrels and packers are rigid tools placed in the coiled tubing while the coiled tubing is being inserted into the well. In addition, the various completion equipment components are of a larger diameter than the coiled tubing (called upset). Since the completion equipment is rigid and has a larger outside diameter than the coiled tubing, these characteristics prevent the completion equipment from being run through a coiled tubing injector head. Therefore, equipment including windows must be provided to couple and splice this type of completion equipment in the coiled tubing string under the injector head. Furthermore, various specialized well control equipment, such as pack-offs and BOP stacks, were required because of the external upsets in the installation. Such installations were much more complicated to operate and required additional equipment when used with live wells which need to be pressure balanced.

The present invention is directed to a coiled tubing completion system which utilizes a continuous flush outside diameter length of coiled tubing and various completion components. The coiled tubing and the components are flexible and may be spooled onto a reel into lengths as long as 25,000 feet. The spool of coiled tubing and components is transported to the well site by a motorized vehicle and may be continuously injected into the well bore. As injection is occurring, a seal of well bore pressure may be more easily maintained around the circumference of the coiled tubing and components allowing the entire length to be placed in the well bore without a killing operation, eliminating the need for expensive kill fluids or damaging the formation. Included in the coiled tubing are various completion equipment, such as safety valves, annular control valves, concentric gas lift valves, packers, landing nipples, and sliding sleeves which are provided with an outside diameter flush with the coiled tubing out, side diameter and which are flexible, spoolable, and with through bores large enough to pass wireline tools for various well completion operations. In addition, some of this equipment, such as safety valves and annular control valves are hydraulically operated through a hydraulic control conduit which must not be upset to the outside diameter of the coiled tubing or interfere with the through bore of the coiled tubing. The coiled tubing completion system is simplified and cost is reduced since well control equipment that is normally required for handling external upsets in a production tubing is not required.

SUMMARY

The present invention is directed to a spoolable, flexible coiled tubing completion system which includes a flexible coiled tubing having an outer wall and a bore therethrough in which the outer wall has a continuous outer diameter without upsets and the bore is adapted to pass wireline tools. The system may include one or more of the following completion components: a longitudinally flexible safety valve, a longitudinally flexible annular control valve positioned in the coiled tubing, one or more longitudinally flexible gas lift valves positioned in the coiled tubing, a longitudinally flexible isolation packer positioned in the coiled tubing, a longitudinally flexible landing nipple positioned in the coiled tubing, a longitudinally flexible sliding sleeve positioned in the coiled tubing, a production packer and a pump out plug. All of the above include a bore therein for passage of wireline tools and have an outside diameter flushed with the outside diameter of the coiled tubing. The safety valve and annular control valve each have a hydraulic control line extending upwardly within the outer wall of the coiled tubing but adjacent the outer wall for avoiding interference with the passage of wireline tools through the coiled tubing bore.

A still further object of the present invention is the provision of a coiled tubing hanger supporting the coiled tubing, a control line housing positioned above the coiled tubing hanger for receiving the upper end of the coiled tubing and for connection to the hydraulic control lines, and an internal connector gripping means having an outside diameter no greater than the coiled tubing for longitudinal movement into the interior of the top of the coiled tubing. In one embodiment, a hydraulic control line cutting means is positioned in the control line housing for cutting any hydraulic control line. In addition, holding means may be provided in the control line hanger for holding the hydraulic control line in tension whereby any cut lines will retract in the coiled tubing and out of the way of the internal connector.

Yet a further object of the present invention is the provision of movable centralizing means in the control line housing for engaging and aligning the-top of the coiled tubing for engagement by the internal connector.

Still a further object of the present invention is the provision of a coiled tubing safety valve having a housing secured to the coiled tubing, a valve closure means in the passageway moving between open and closed position for controlling the fluid flow through the passageway, a flow tube telescopically moving in the housing for controlling the movement of the valve closure member, hydraulic piston and cylinder fluid actuating means positioned above and connected to the flow tube with a biasing spring means positioned about the flow tube and connected thereto for moving the valve to a closed position. The spring means and the flow tube are longitudinally flexible for allowing bending about the longitudinal axis of the valve for allowing the valve to be spooled on a coiled tubing reel. Preferably, the hydraulic actuating means is connected to the flow tube by a flexible connection. Preferably, a downstop is connected to the inside of the coiled tubing for limiting the movement of the flow tube. In one embodiment, the coiled tubing includes a wall and a hydraulic control line is connected to the hydraulic piston and cylinder actuating means and is positioned in the wall of the coiled tubing. The longitudinally flexible valve is provided longitudinal flexibility by having a housing which includes first and second separated parts secured to the inside of the coiled tubing, and includes a plurality of separated longitudinally extending ribs.

Yet a further object of the present invention is the provision of a hydraulically controlled annular control valve having a housing with an expandable flexible cup seal having a sealing lip and positioned around the housing for sealing between the housing and a well conduit, hydraulic piston and cylinder means for retracting the cup seal, expandable slip means positioned around the housing for gripping the interior of the well conduit and a second hydraulic piston and cylinder means for expanding the slip means. The flexible cup and the slip means are initially retracted to an outer dimension substantially equal to the outside diameter of the coiled tubing and the control valve for passing through an injector and wellhead. The control valve is longitudinally flexible for allowing bending about its longitudinal axis for allowing the valve to be spooled on a coiled tubing reel. Preferably, the annular control valve includes a longitudinally movable protector sleeve initially covering and protecting the seal lip, spring means biasing the cup seal into a fail safe expanded sealing relationship, movable wedge means for expanding the cup seal, a second spring means for biasing the cup seal toward a retracted position, and a breakable protective covering initially positioned about the cup seal and the slips.

Still a further object of the present invention is the provision of a spoolable, flexible hydraulically set, straight pull release well packer positioned in the coiled tubing and including a mandrel having a bore therethrough for the passage of wireline tools, an expandable packer seal positioned about the mandrel, expandable slip means positioned about the mandrel in which the packer seal and slip means are initially retracted to an outer dimension substantially equal to the outside diameter of the coiled tubing. Hydraulic piston and cylinder actuating means are positioned outside the mandrel and between the packer seal and the slip means for setting the slip means in the packer seal. The well packer is longitudinally flexible for allowing bending about its longitudinal axis for allowing the packer to be spooled on a coiled tubing reel. Preferably, the piston and cylinder actuating means is longitudinally flexible and a breakable protective coating is initially positioned around the packer and the slip means.

Still a further object of the present invention is the provision of a spoolable, flexible landing nipple positioned in a coiled tubing for receiving well tools which includes first and second separate spaced tubular members in which the members each have a bore extending therethrough for the passage of wireline tools. Each of the members is secured to the inside of the coiled tubing and a flexible boot is positioned between each of the members and the inside of the coiled tubing. Preferably, one of the members include a no-go shoulder and a locking recess and the other of the members includes a polished bore.

Yet a still further object of the present invention is the provision of a spoolable, flexible sliding sleeve positioned in a coiled tubing for controlling communication between the inside and the outside of the coiled tubing. The sleeve includes a tubular housing having a bore therein for the passage of wireline tools and has first and second ends connected in a coiled tubing. The housing includes at least one port for communicating between the outside and inside of the housing. A sliding tubular member telescopically moves in the housing for opening and closing the ports. An upper and lower guide is positioned on opposite sides of the member and secured to the inside of the coiled tubing, and a flexible boot is positioned between each of the guides and the inside of the coiled tubing wherein the sliding sleeve is longitudinally flexible for allowing the sliding sleeve to be spooled on a coiled tubing reel.

A still further object of the present invention is the provision of a retrievable system for retrieving a coiled tubing system having a continuous sized outside diameter which includes a coiled tubing hanger supporting and sealing the outside of the upper end of the coiled tubing with a wellhead, a blowout preventer and an injector head successively positioned above the coiled tubing hanger, and a second coiled tubing positioned on a reel and having a first end with a longitudinally actuated internal gripping connector attached thereto for insertion through the injector, blowout preventer and wellhead and into the upper end of the first coiled tubing for gripping and removal the tubing from the well.

Yet a further object is the provision of a control line housing positioned above the coiled tubing hanger for receiving the upper end of the first coiled tubing and for connection to any hydraulic lines in the first coiled tubing. Preferably, a hydraulic control line cutting means is positioned in the control line housing for cutting any control lines for preventing the control lines from interfering with the internal gripping connector. Preferably holding means are provided in the control line hanger for holding the hydraulic control lines in tension whereby a cut line will retract in the first coiled tubing housing and out of the way of the internal connector. Preferably centralizing means are provided in the control line housing for engaging and aligning the top of the first coiled tubing for engagement by the internal connector. Preferably the centralizing means is transversely movable in relation to the longitudinal axis of the control line housing. Preferably the centralizing means includes a guide for guiding the internal connector into the top of the first coiled tubing.

Other and further objects, features and advantages will be apparent from the following description of presently preferred embodiments of the invention, given for the purpose of disclosure, and taken in conjunction with the accompanying drawings.

DESCRIPTION OF THE PREFERRED EMBODIMENT

While the spoolable coiled tubing completion system of the present invention will be described, for purposes of illustration only as including a tubing retrievable safety valve, an annular safety vane, one or more concentric gas lift valves, an isolation packer, a landing nipple, a sliding sleeve, a production packer and a pump out plug, many completion systems may utilize only some of this equipment depending upon the particular application.

Figure 1A:
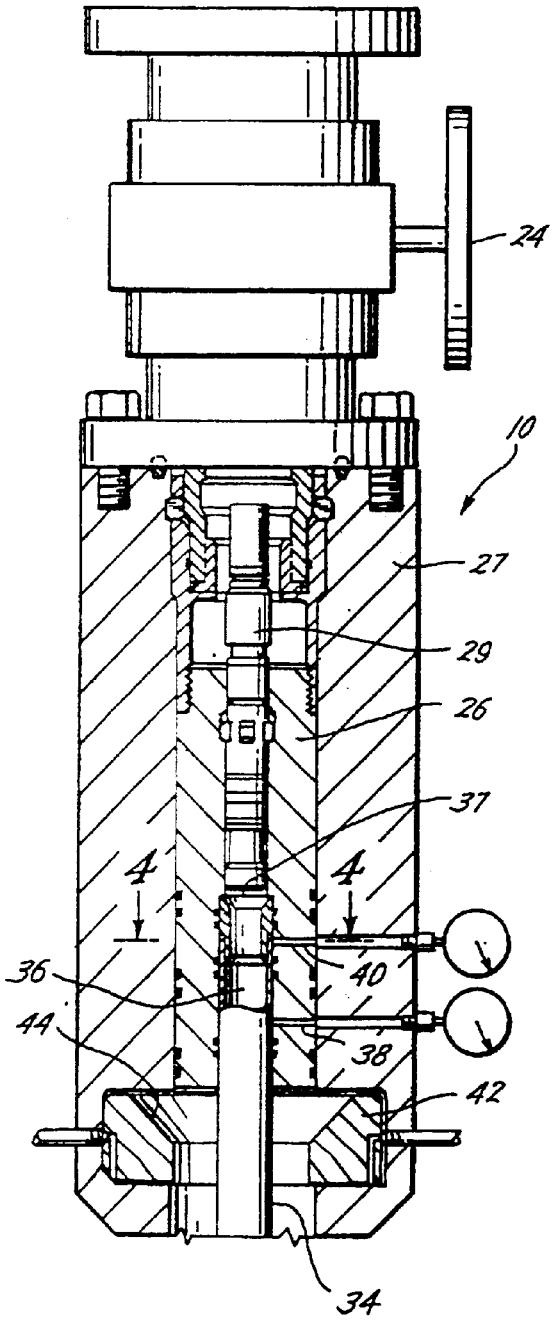
FIGS. 1A, 1B, 1C, 1D, 1E, 1F, 1G, 1H, 1I, 1J, 1K, 1L, 1M, 1N, 1O, 1P, 1Q, 1R, 1S, 1T, and 1U are fragmentary elevational views, partly in cross section, and together form a spoolable coiled tubing completion system of the present invention.
Figure 1B:
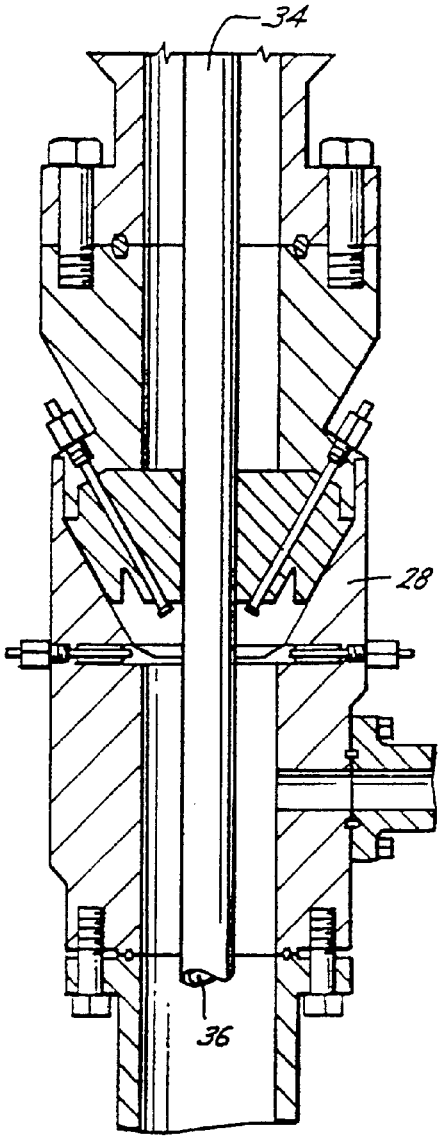
Figure 1C:
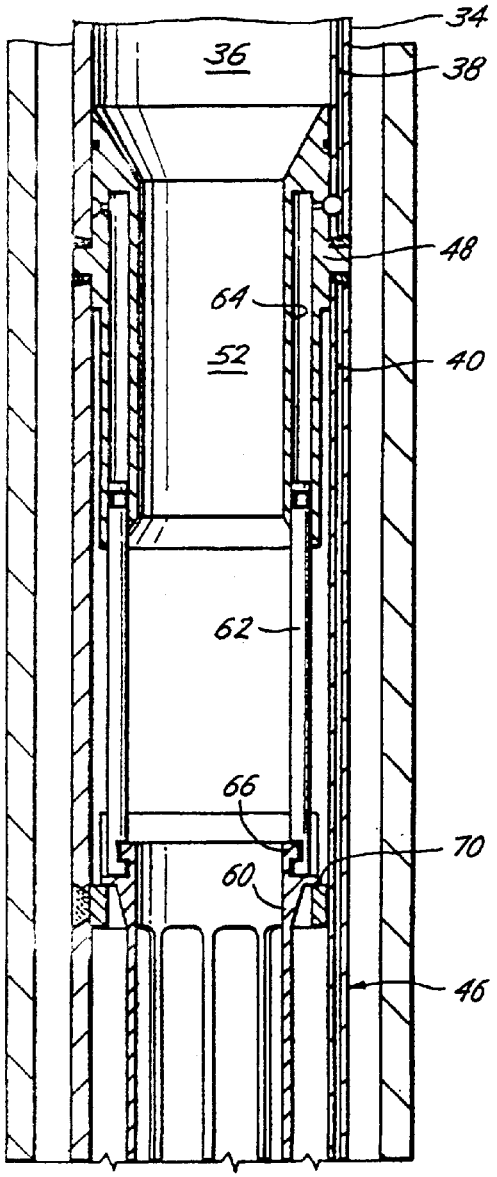
Figure 1D:
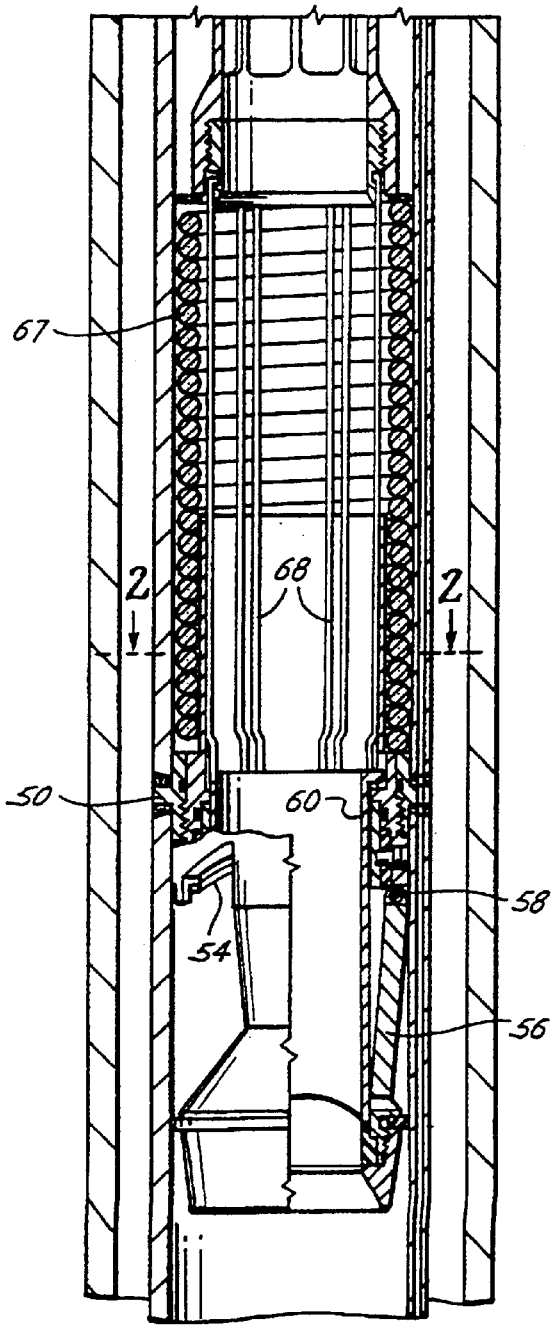
Figure 1E:
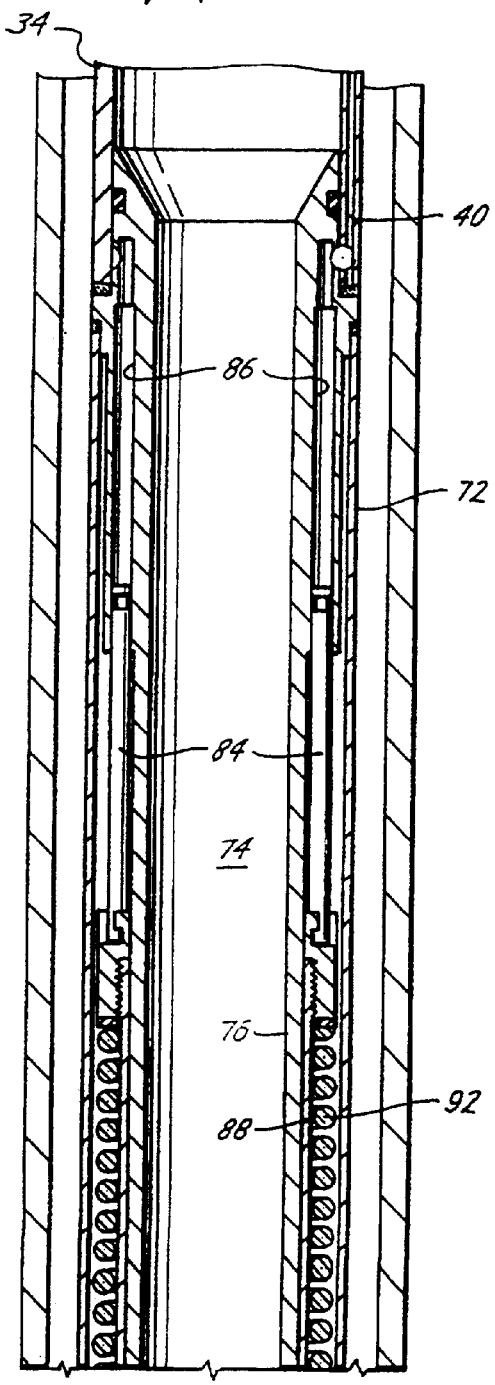
Figure 1F:
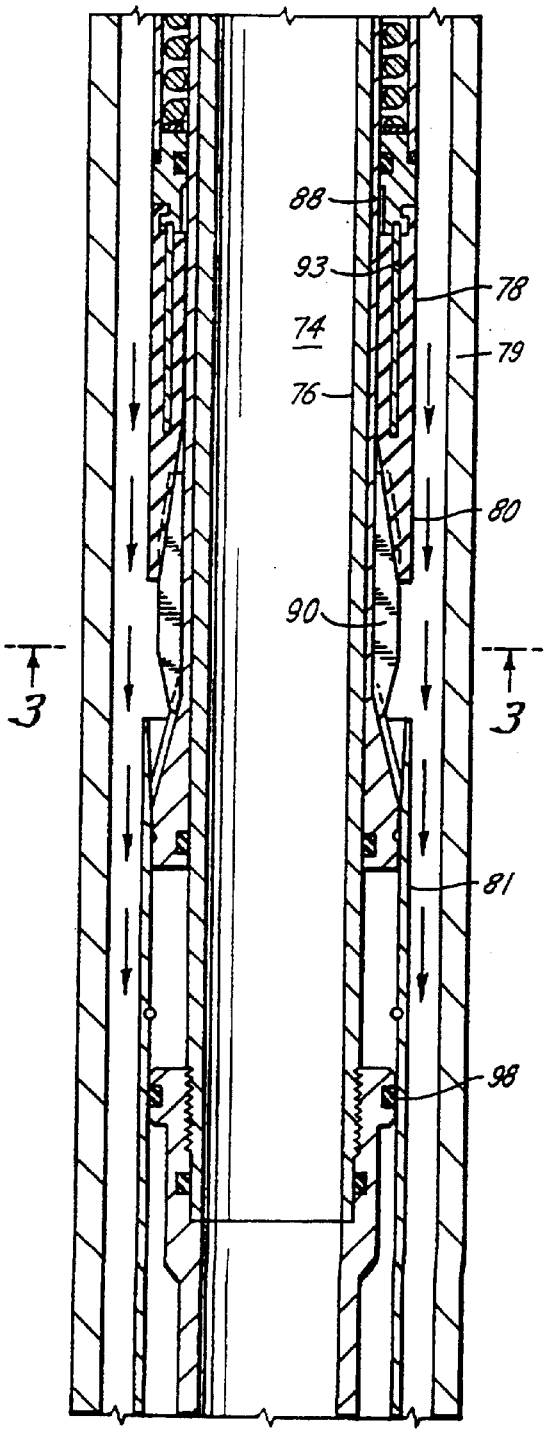
Figure 1G:
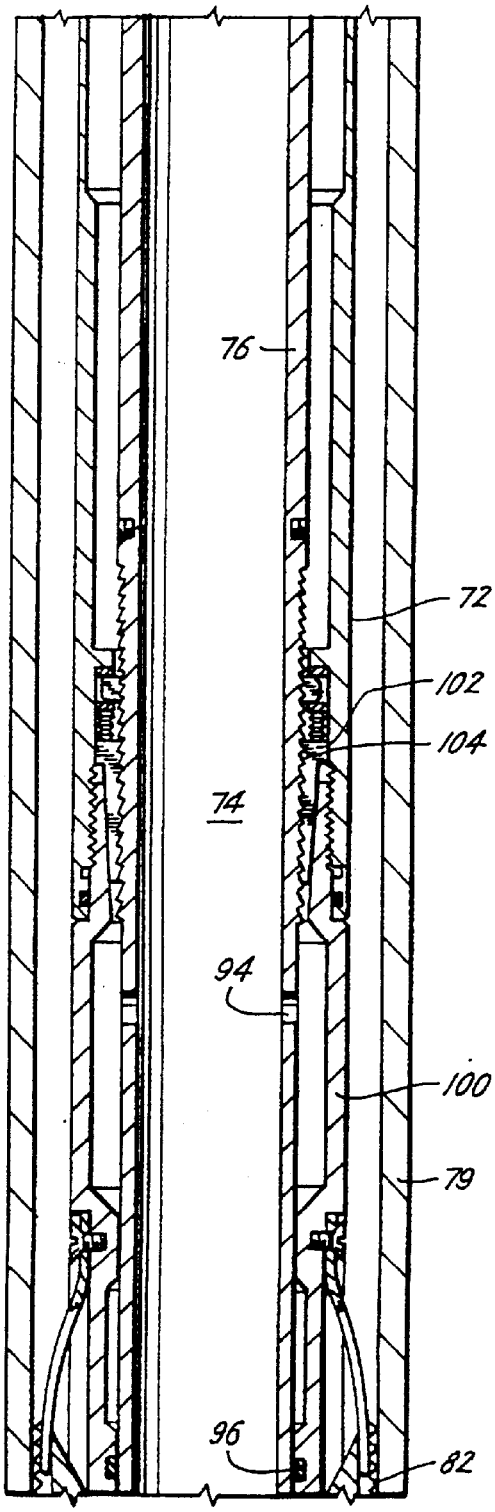
Figure 1H:
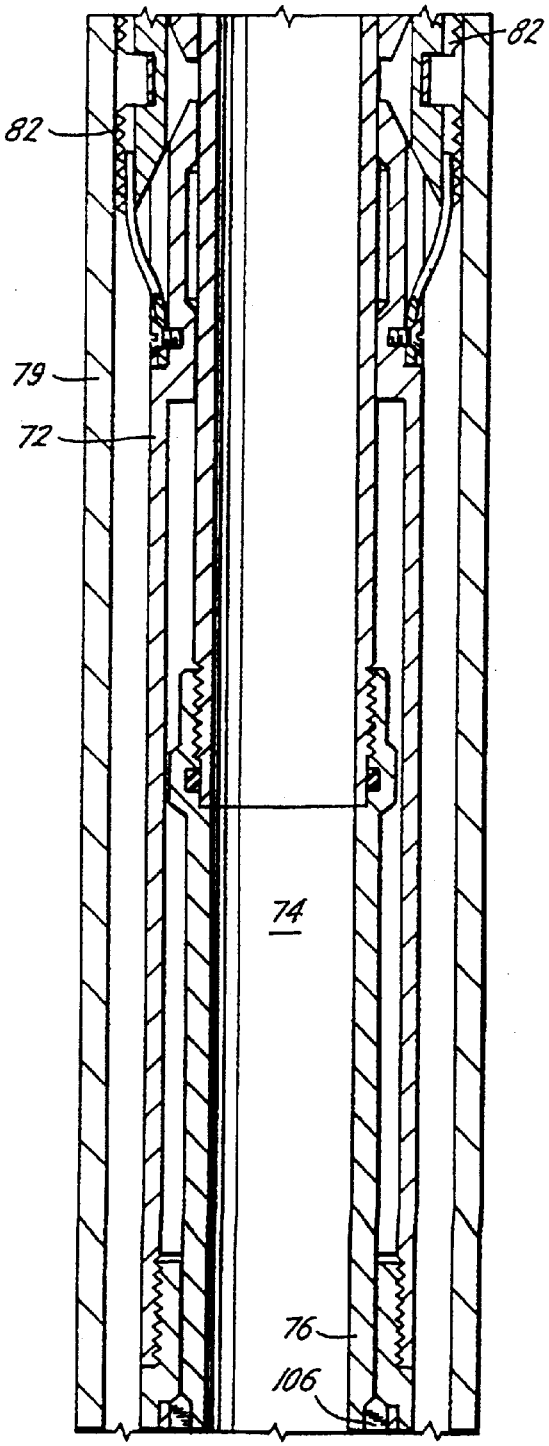
Figure 1I:
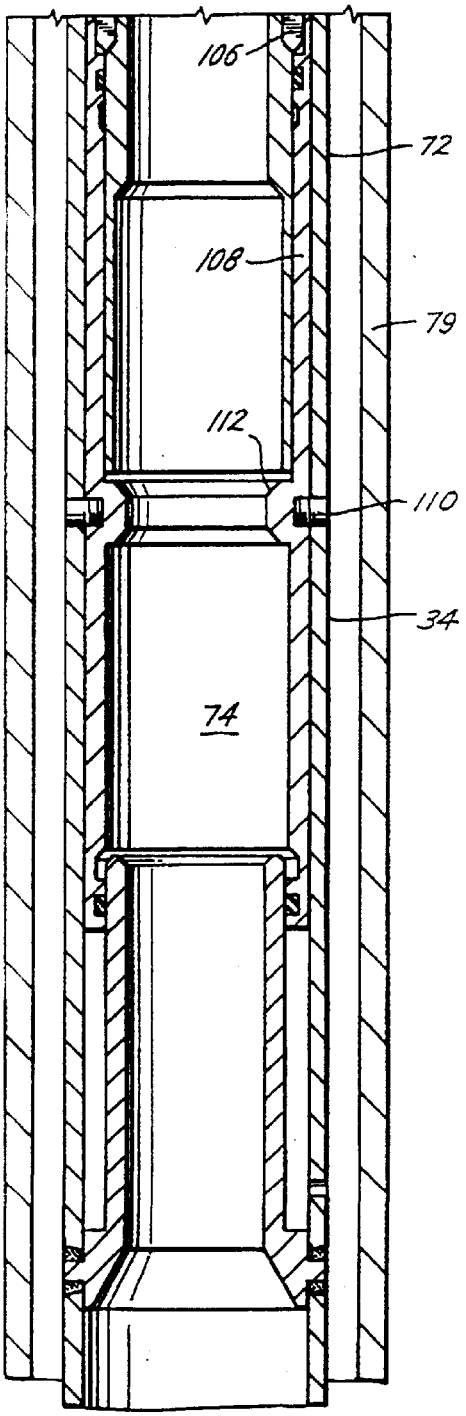
Figure 1J:
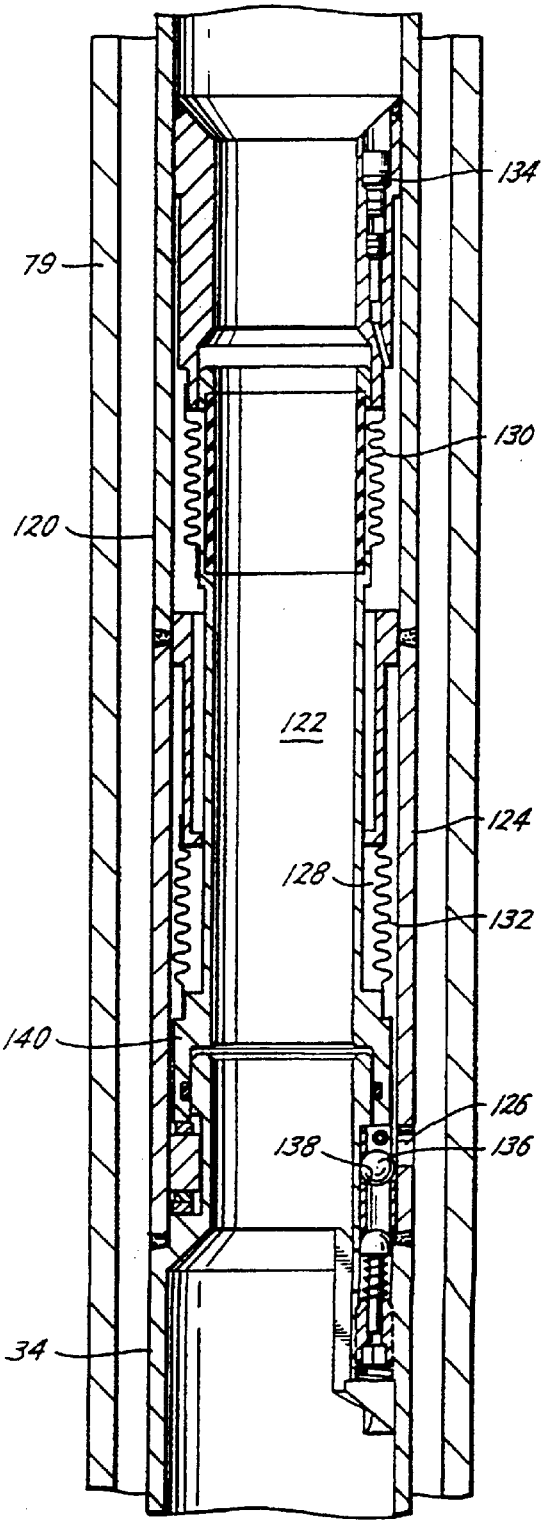
Figure 1K:
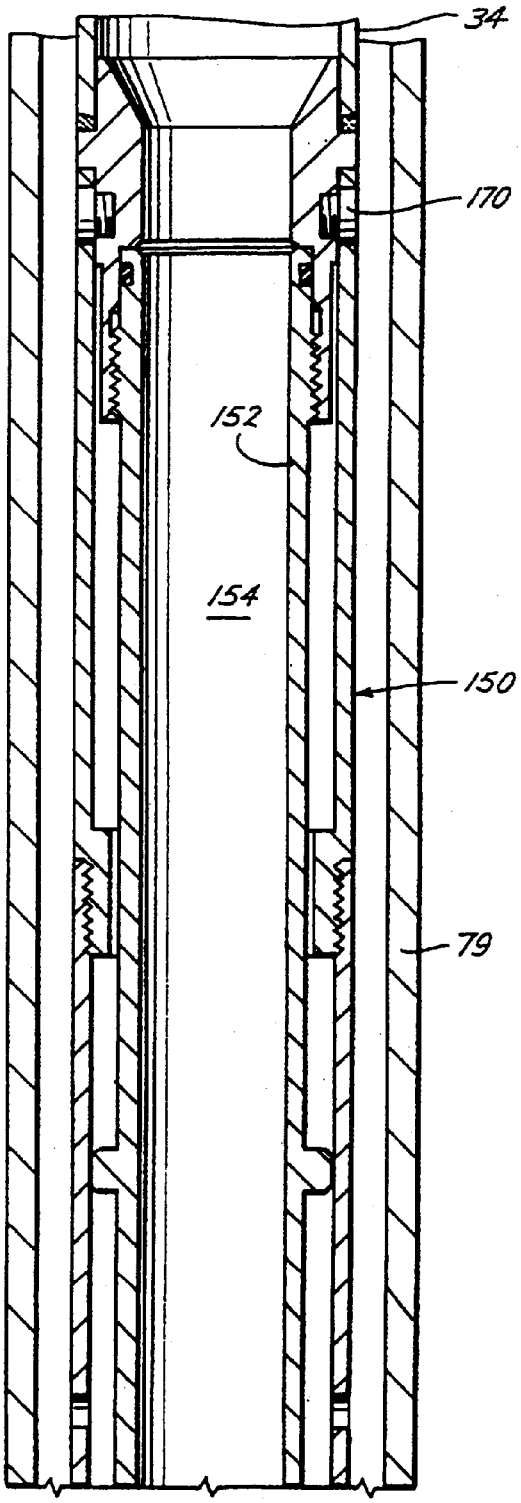
Figure 1L:
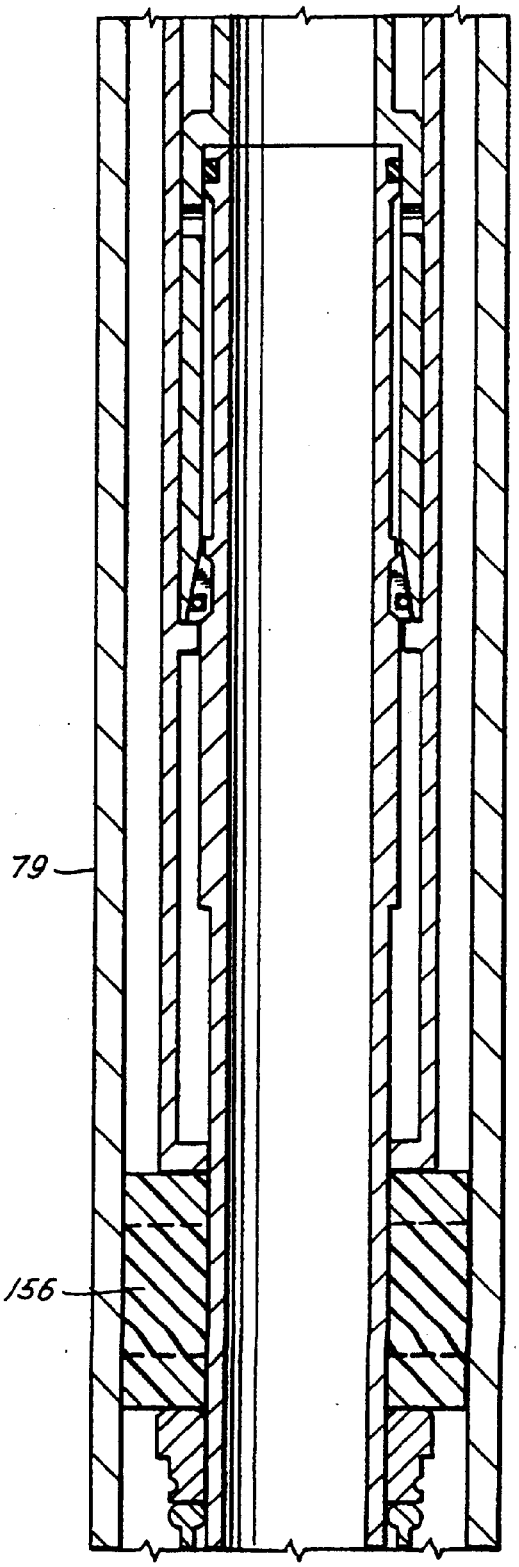
Figure 1M:
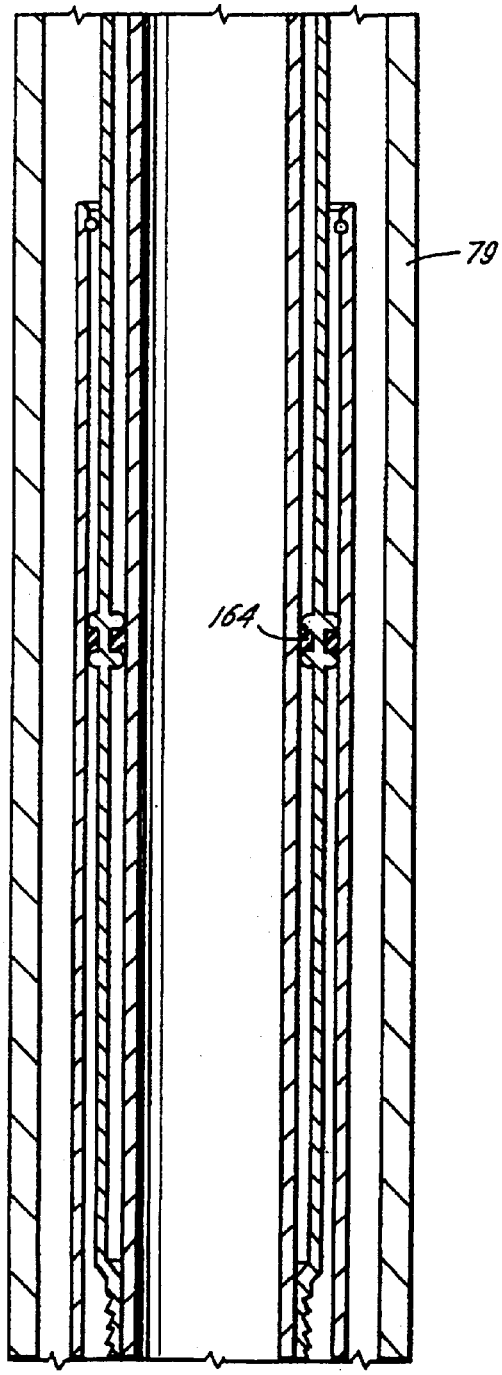
Figure 1N:
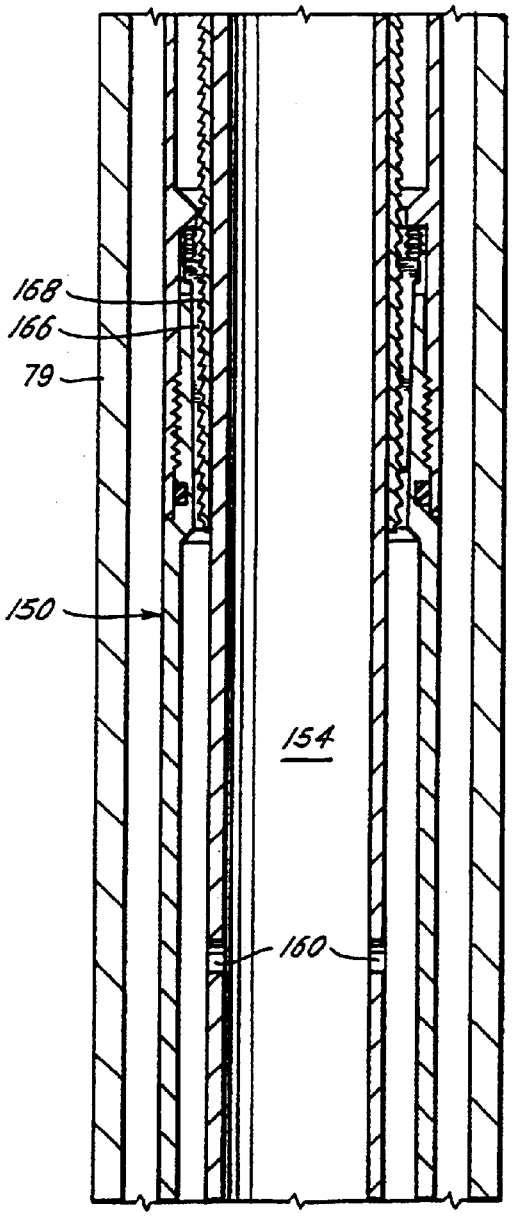
Figure 1O:
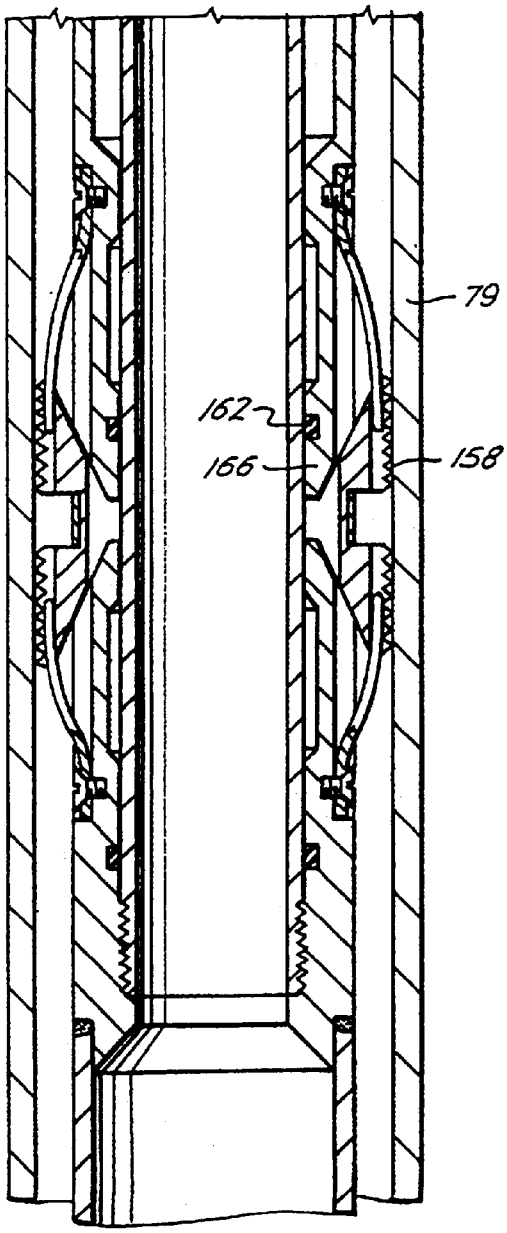
Figure 1P:
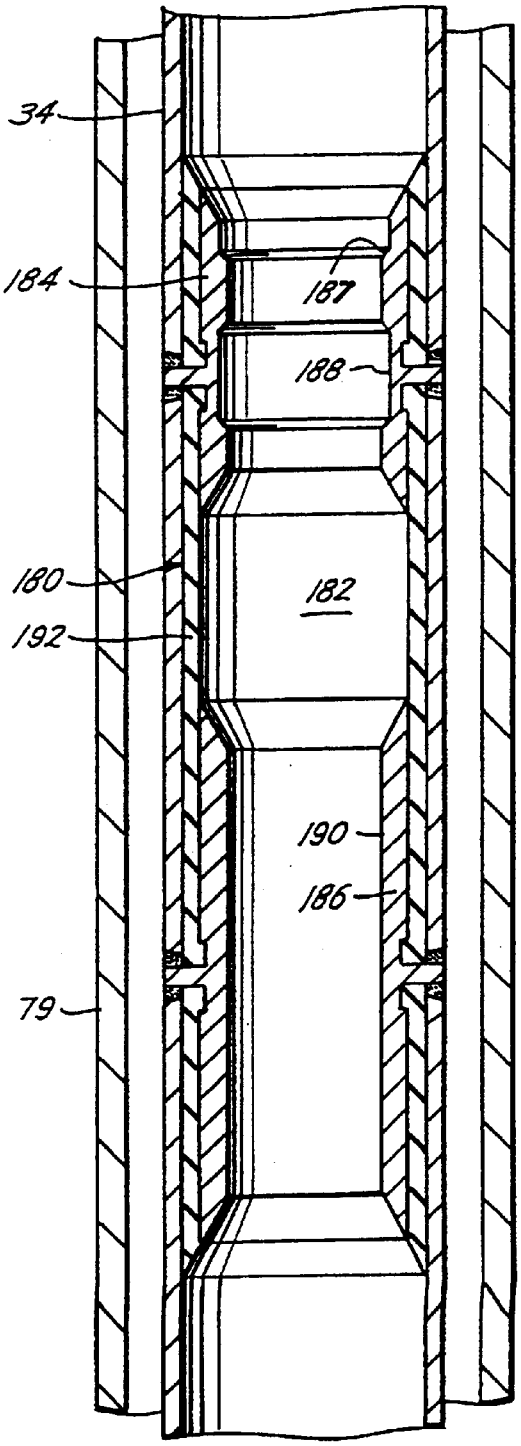
Figure 1Q:
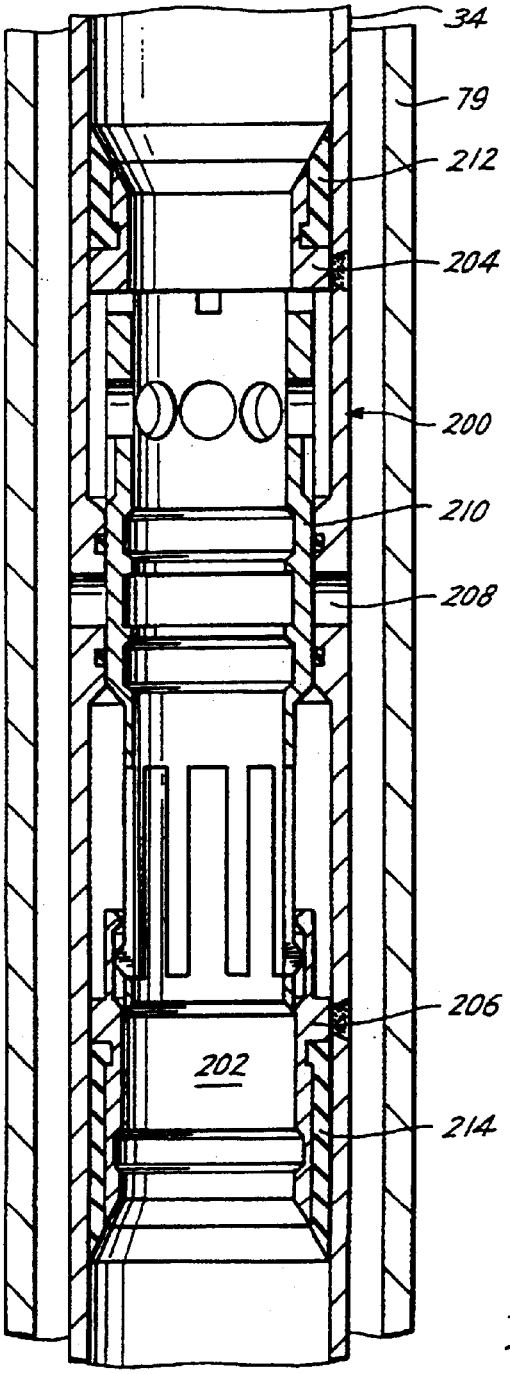
Figure 1R:
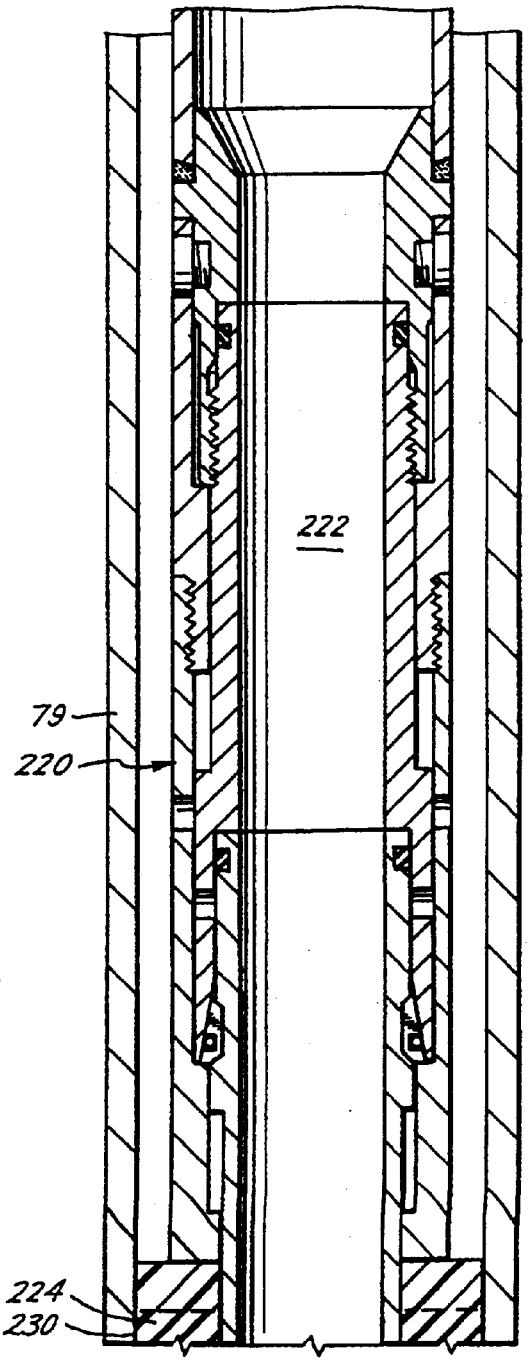
Figure 1S:
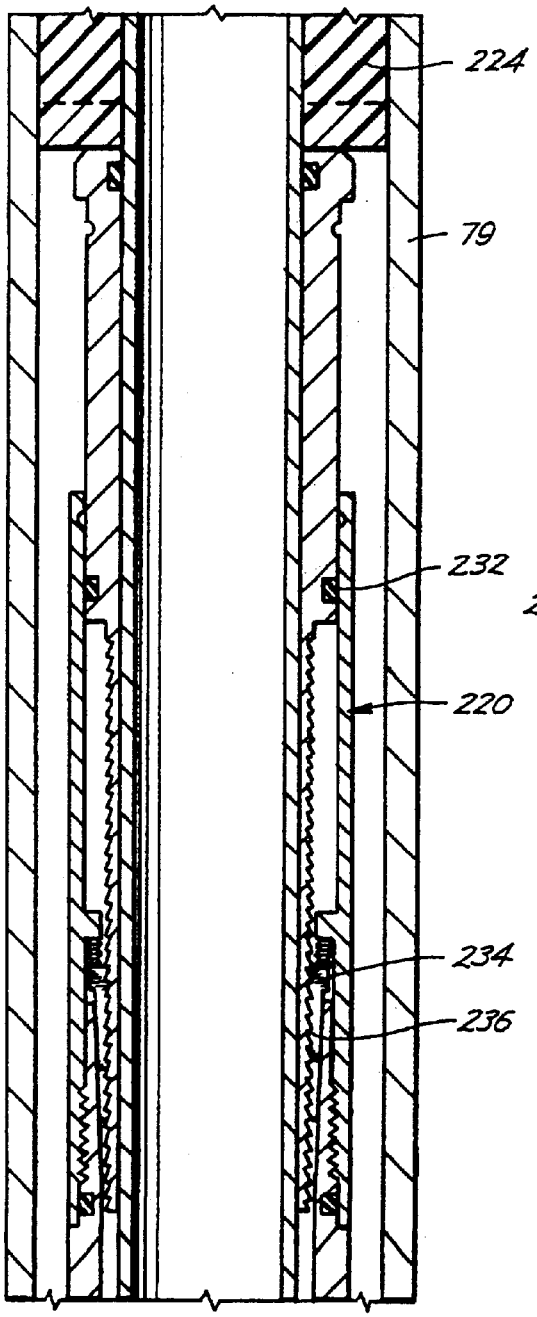
Figure 1T:
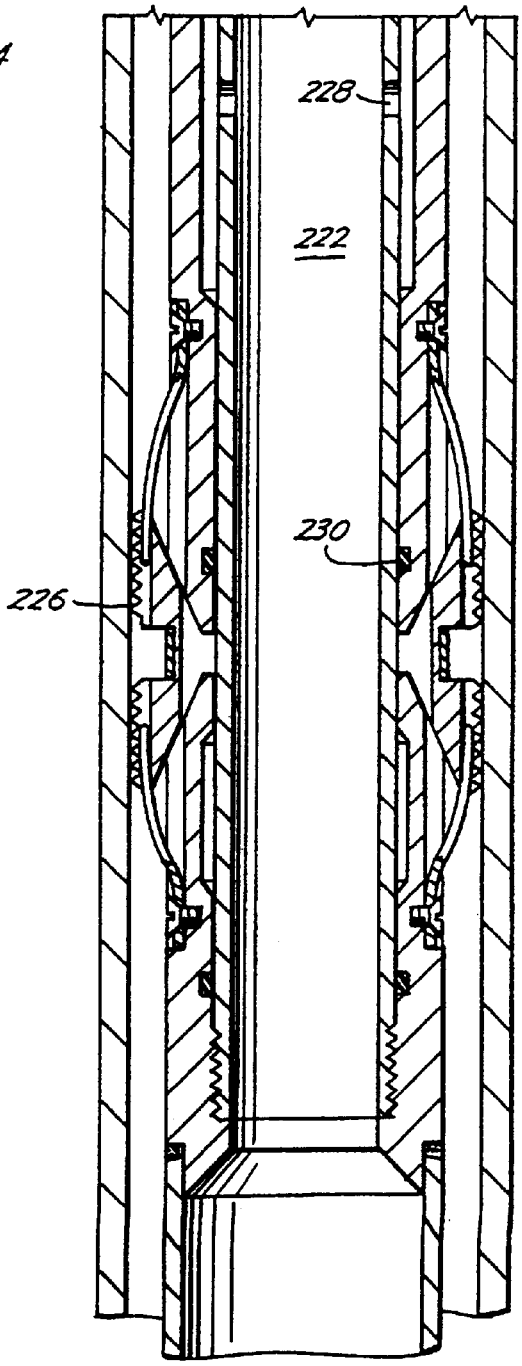
Figure 1U:
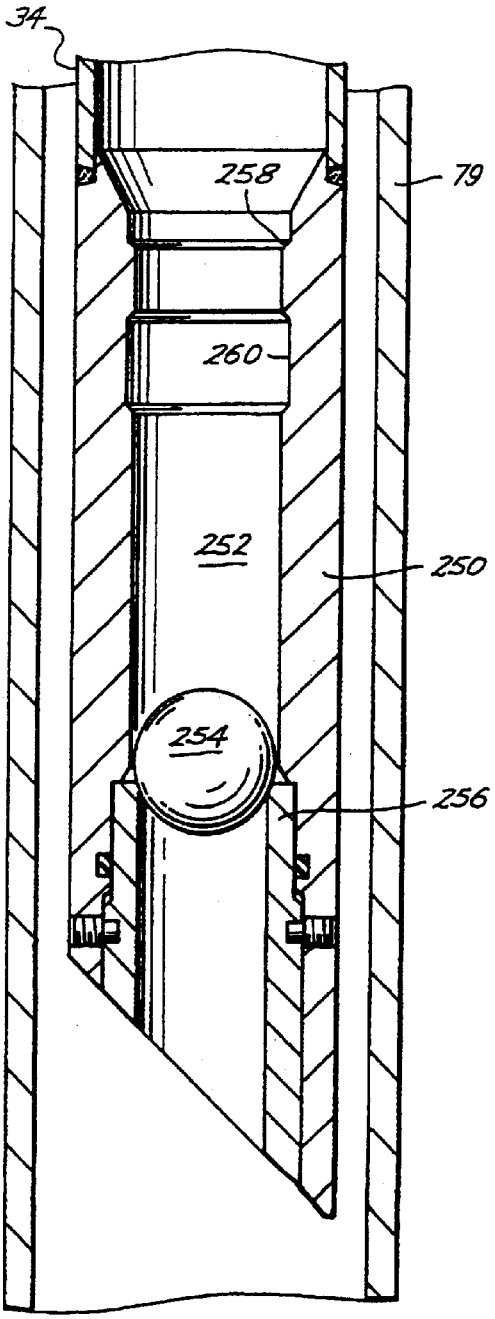
Figure 15:
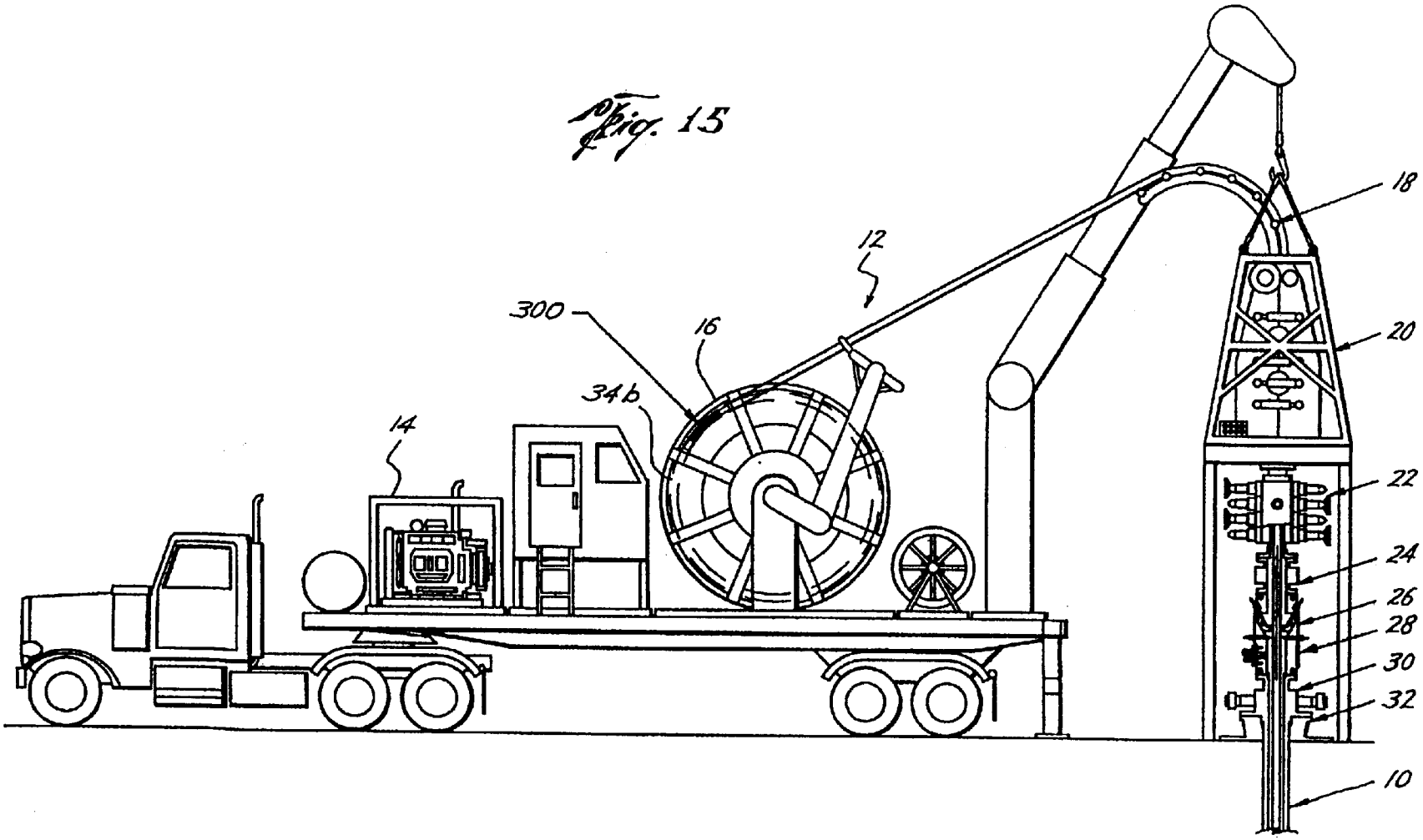
FIG. 15 is an elevational view of a retrieval system connected to the spoolable coiled tubing completion system of the present invention.

Referring now to FIGS. 1A–1U, the spoolable coiled tubing completion system of the present invention is best seen and is referred to by the reference numeral 10 and is installed and retrieved though a retrieval system generally indicated by the reference numeral 12 (FIG. 15). The completion system 10 is installed and retrieved by the retrieval system 12 which generally includes a mobile truck and power unit 14 having a conventional coiled tubing reel 16 which inserts and removes the completion system 10 through a guide arch 18, an injector head 20, a blowout preventer 22, a wellhead or valve 24, a control line housing 26, a coiled tubing hanger 28, a tubing hanger 30, and a casing hanger 32.

As will be more fully discussed hereinafter, a completion system 10 is longitudinally flexible and can be spooled on the reel 16. All of the components have a flush diameter substantially equal to the outside diameter of the coiled tubing, but yet have a bore with a passageway therethrough for passage of wireline tools. Thus, the completion system 10 is highly advantageous as it may be inserted into and retrieved with the retrieval system 12 without requiring a window to insert or splice equipment into the coiled tubing and allows the use of standard well control equipment such as the injector head 20, the BOP 22 and any packoffs therein to control annular pressure because of the externally flushed design of the system 10. Thus, the installation of the present invention is simplified and cost reduced since well control equipment for external upsets is not required.

Figure 4:
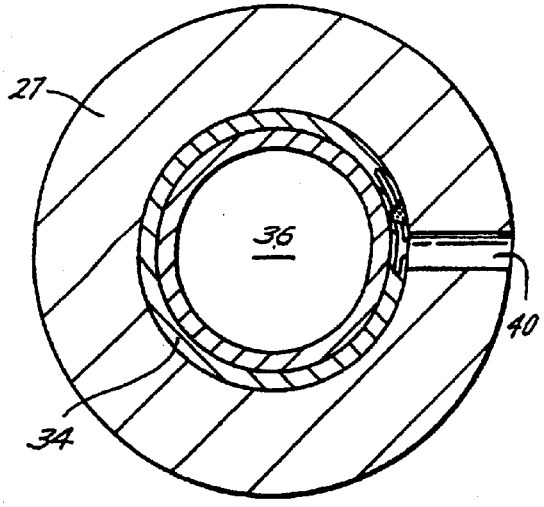
FIG. 4 is a cross-sectional view taken along the line 4—4 of FIG. 1A.

Referring now to FIGS. 1A, 1B and 4, a flexible coiled tubing 34 has an outer wall and a bore 36 therethrough in which the outer wall has a continuous outer diameter without upsets and the bore is adapted to pass wireline tools. The coiled tubing 34 is supported in the coiled tubing hanger 28 (FIG. 1B) and the top 37 of the coiled tubing 34 extends up into the control line hanger 26 for providing one or more hydraulic control line exits for any hydraulic control lines which are utilized in the completion system 10 such as a safety valve and annular control valve, which will be more fully discussed hereinafter. The preferred embodiment is to provide two hydraulic control lines 38 and 40 within and inside the wall of the coiled tubing 34 as more fully described in patent application Ser. No. 08/142,637, filed Oct. 25, 1993, entitled "Coiled Tubing With Control Conduit And Manufacture Thereof", now abandoned, which is hereby incorporated by reference. The control line hanger 26 is positioned in a control line housing 27 which may include a conventional pressure test plug 29. Additionally, movable centralizing means, such as guides 42, are provided in the control line housing 27 for being transversely movable to the axis of the coiled tubing 34 for supporting the upper end 37 of the coiled tubing 34 during the retrieval process as will be more fully discussed hereinafter. Preferably, the guides 42 include inclined surfaces 44.

Figure 2:
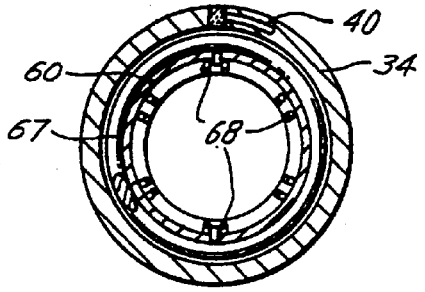
FIG. 2 is a cross-sectional view taken along the line 2—2 of FIG. 1D.
Figure 6A:
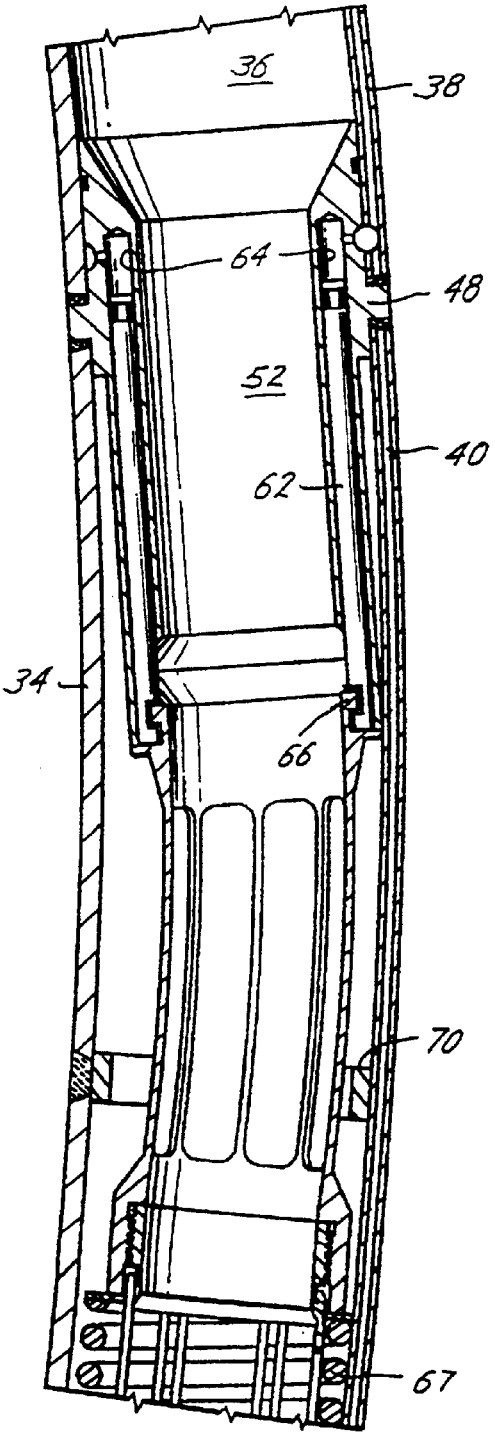
FIGS. 6A and 6B are elevational views, in cross section, illustrating the flexible hydraulically controlled safety valve of the present invention in a spooled and closed position.
Figure 6B:
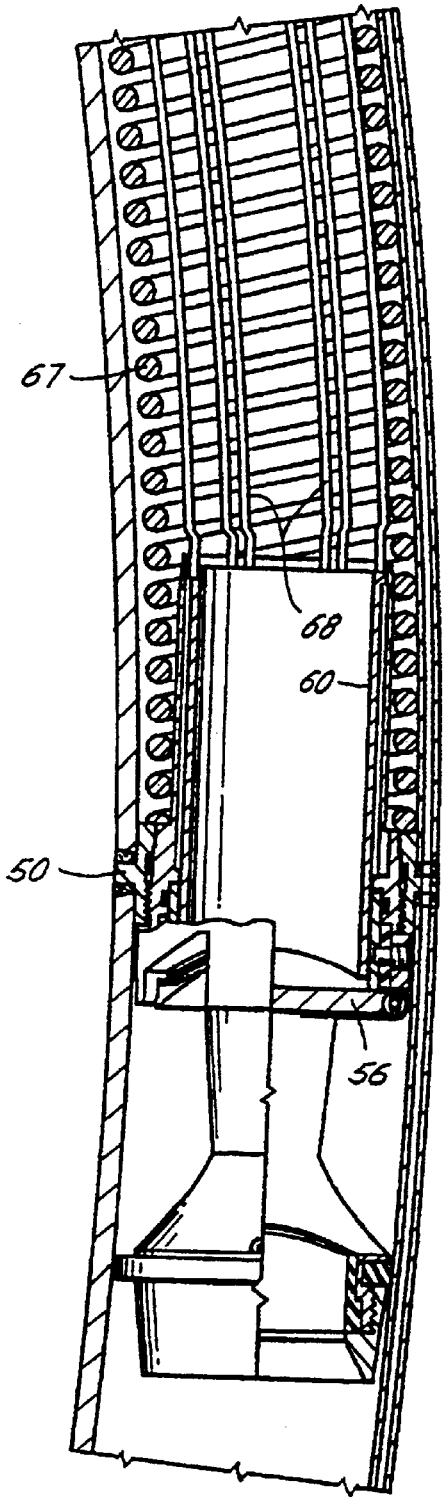

Referring now to FIGS. 1C, 1D and 2, a surface control subsurface spoolable hydraulic control longitudinally flexible safety valve is generally indicated by the reference numeral 46 having a housing which includes first 48 and second 50 separated parts each of which is secured to the inside of the coiled tubing 34 and which forms part of the housing of the safety valve 46 and thus presents a flush exterior with the remainder of the coiled tubing 34 without requiring any upsets. The valve 46 generally includes a bore 52 therethrough for the passage of wireline tools, an annular valve seat 54, a valve closure element or flapper valve 56 connected to the housing by pivot pin 58, a flow tube 60 is telescopically movable in the housing through the valve seat 54 to move the flapper 56 to the open position as best seen in FIG. 1D. When the flow tube 60 is moved upwardly, the flapper 56 is allowed to move upwardly onto the seat 54. Hydraulic piston and cylinder actuating means such as one or more pistons 62 and cylinders 64 in communication with hydraulic conduit 38 are positioned above and connected to the flow tube 60 by a flexible connection 66, such as a loose tongue and groove connection, for moving the flow tube 60 downwardly and opening the valve 46. A biasing spring 67 is positioned about the flow tube 60 and connected thereto for moving the flow tube 60 upwardly and into a fail safe closed position. The spring 67 and the flow tube 60 are longitudinally flexible for allowing bending about the longitudinal axis of the valve for allowing the valve to be spooled onto a coiled tubing reel. Preferably, the flow tube 60 includes a plurality of separated longitudinally extending ribs 68 for providing longitudinal flexibility. In addition, the valve 46 includes a down stop 70 positioned to engage a stop on the flow tube 60 for preventing excessive column loading in the safety valve 46. Referring now to FIGS. 6A and 6B, the safety valve 46 is shown in the closed and spooled condition.

Referring now to FIGS. 1E, 1F, 1G, 1H and 1I, a surface control subsurface annular control safety valve which is longitudinally flexible, spoolable and hydraulically controlled is positioned in the coiled tubing 34 and has a bore 74 therein for passage of wireline tools. The valve 72 includes a housing 76 having an outside diameter substantially equal to the outside diameter of the coiled tubing 34. The valve 72 includes an expandable, flexible cup seal 78 having a sealing lip 80 and is positioned around the housing 76 for sealing between the housing 76 and a well conduit 79 which may be production tubing or well casing. The valve 72 also includes slips 82 outside of the housing 76.

Figure 7A:
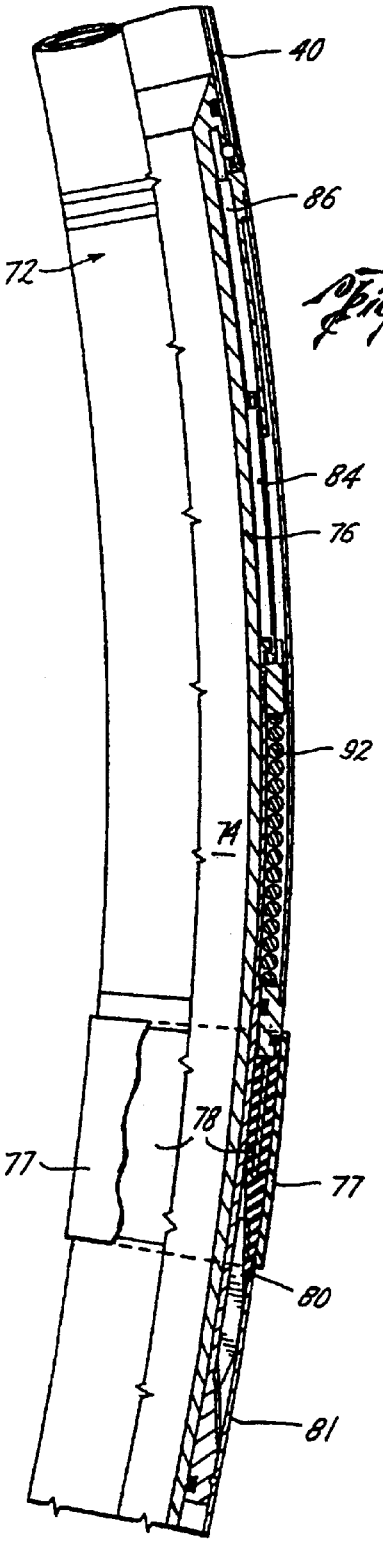
FIGS. 7A, 7B and 7C is an elevational view, in quarter section of the hydraulic control annular control valve of the present invention in the retracted and spooled position.
Figure 7B:
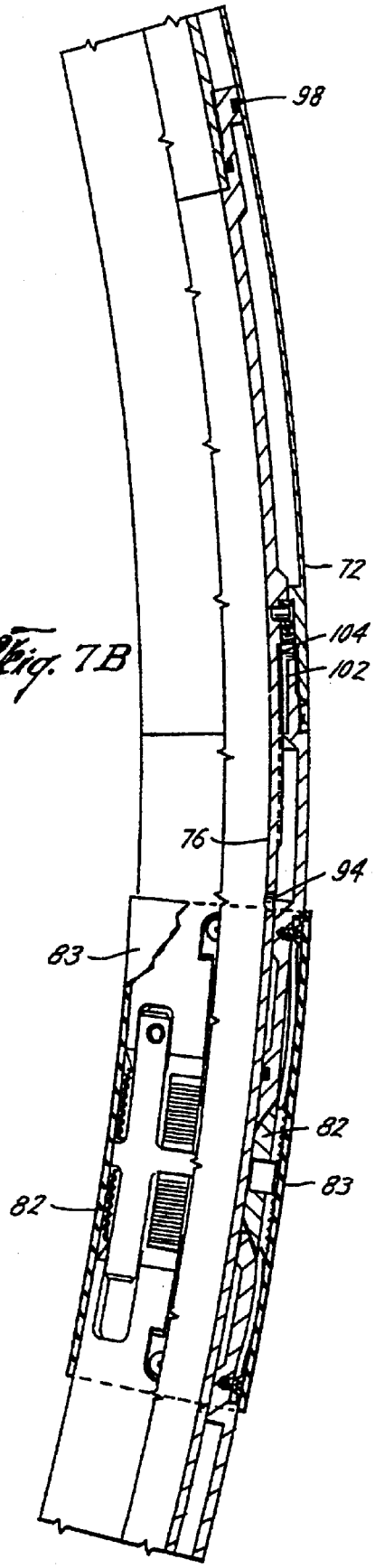
Figure 7C:
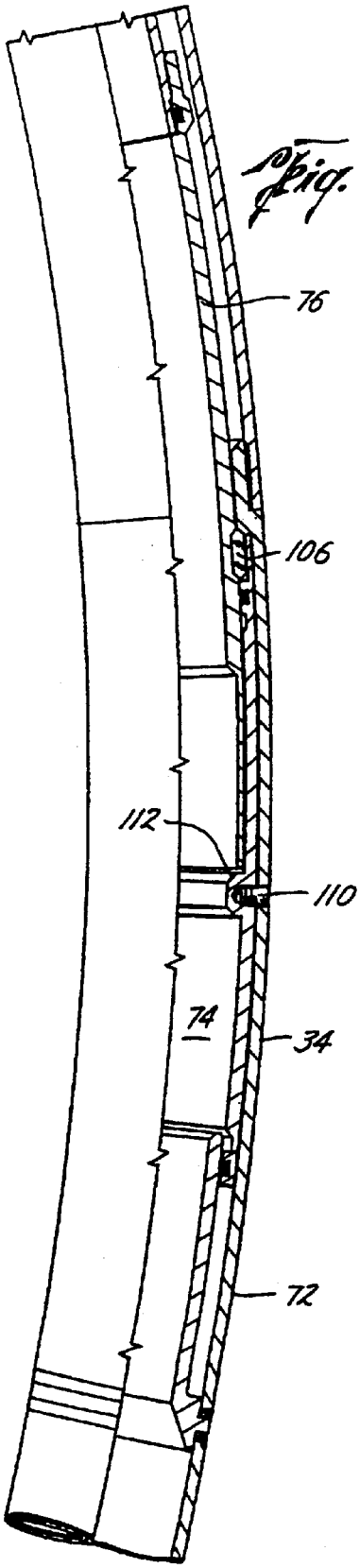
Figure 8A:
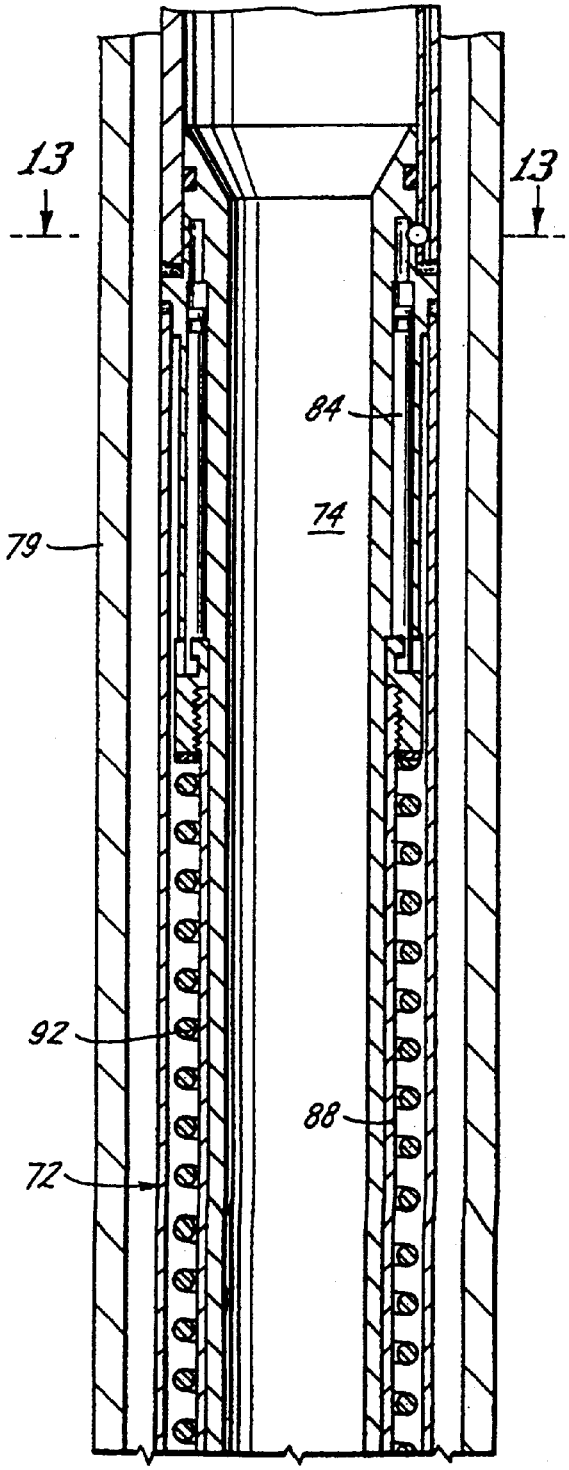
FIGS. 8A, 8B, 8C, 8D and 8E are continuations of each other and form an elevational view, in cross section, of the annular control valve of the present invention in position in a well conduit in a closed position.
Figure 8B:
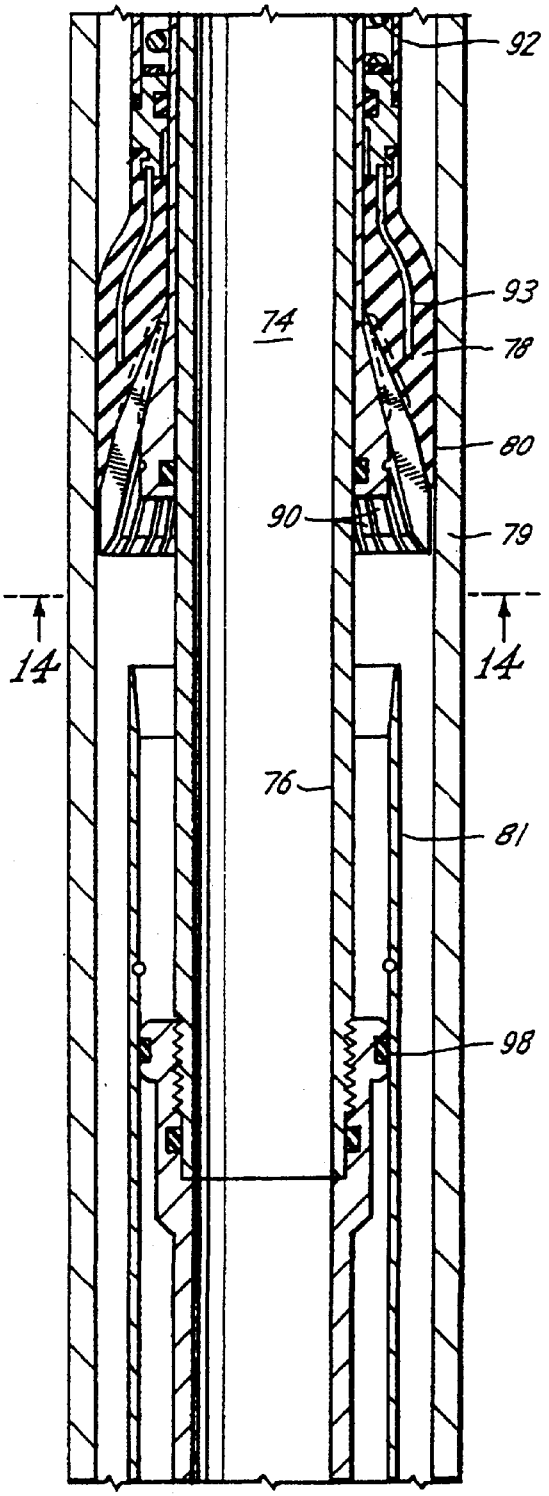
Figure 8C:
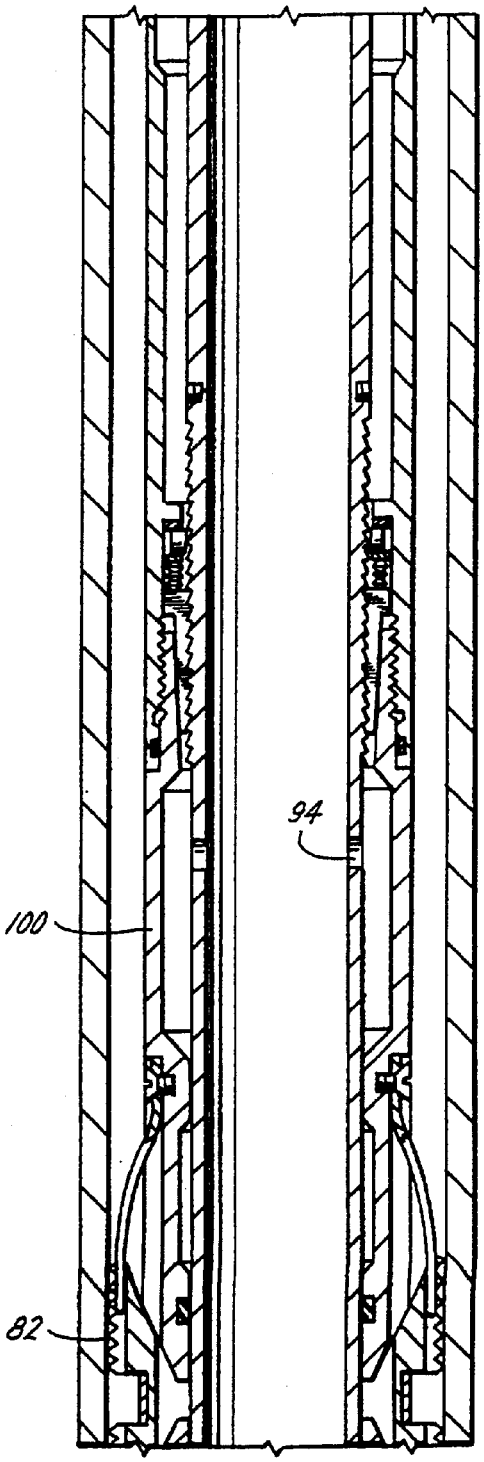
Figure 8D:
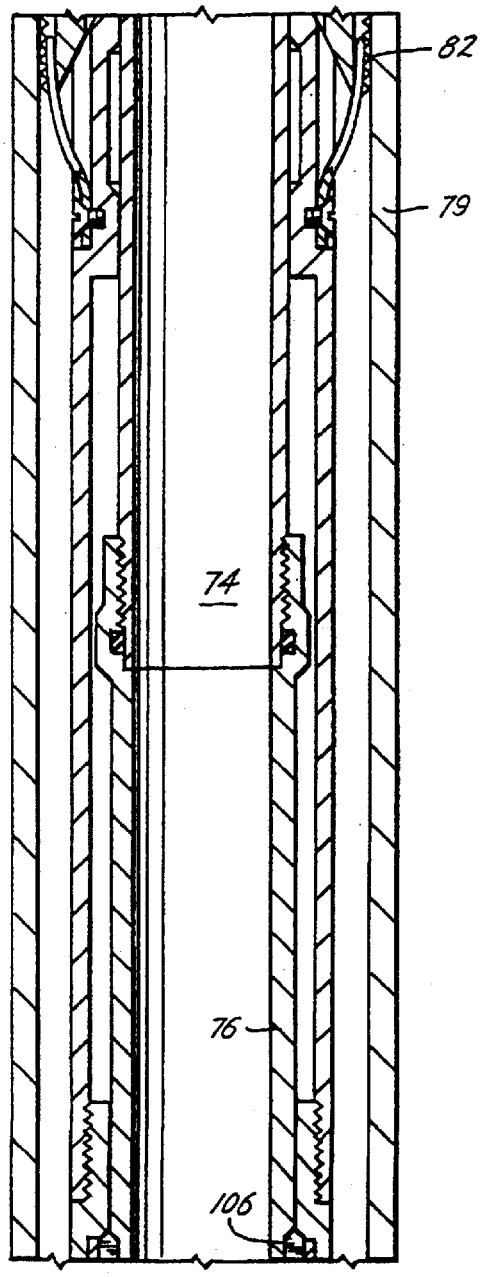
Figure 8E:
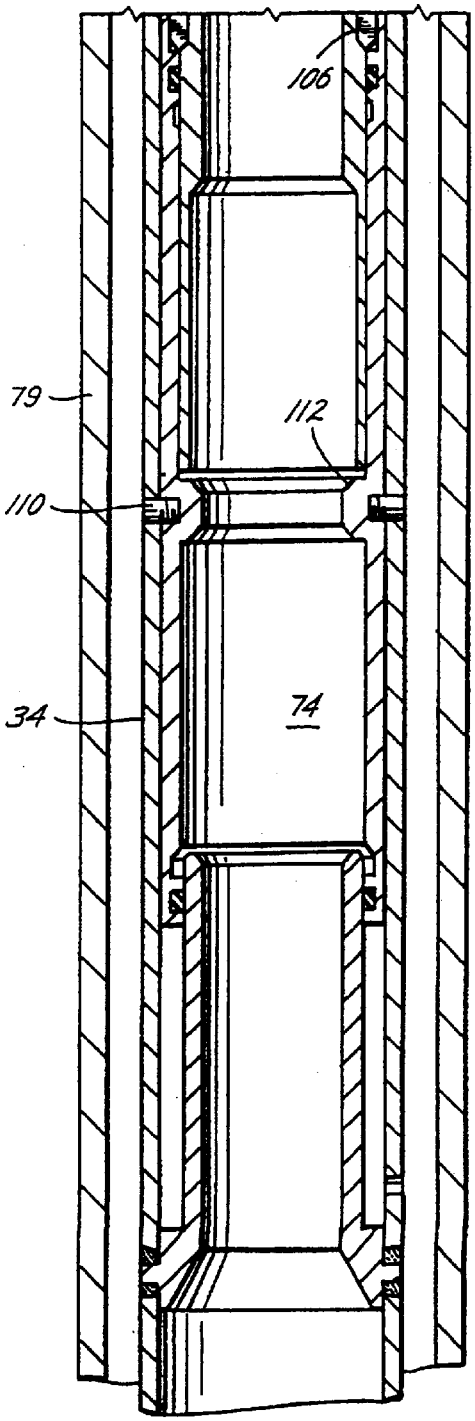
Figure 9A:
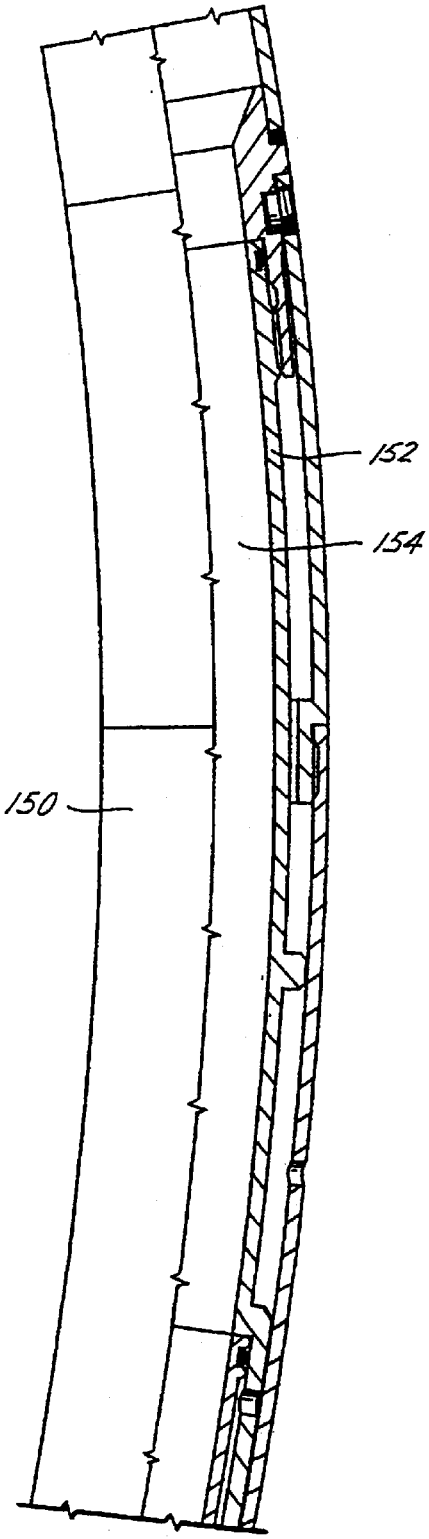
FIGS. 9A, 9B, 9C and 9D are continuations of each other and form an elevational view in quarter section of the isolation packer of the present invention in a retracted and spooled position.
Figure 9B:
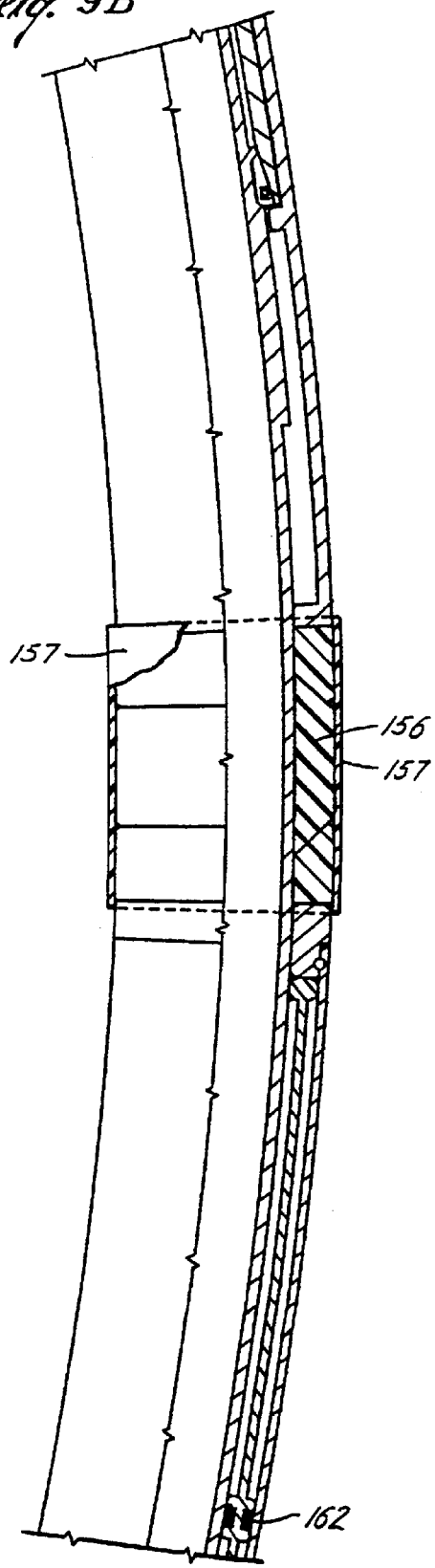
Figure 9C:
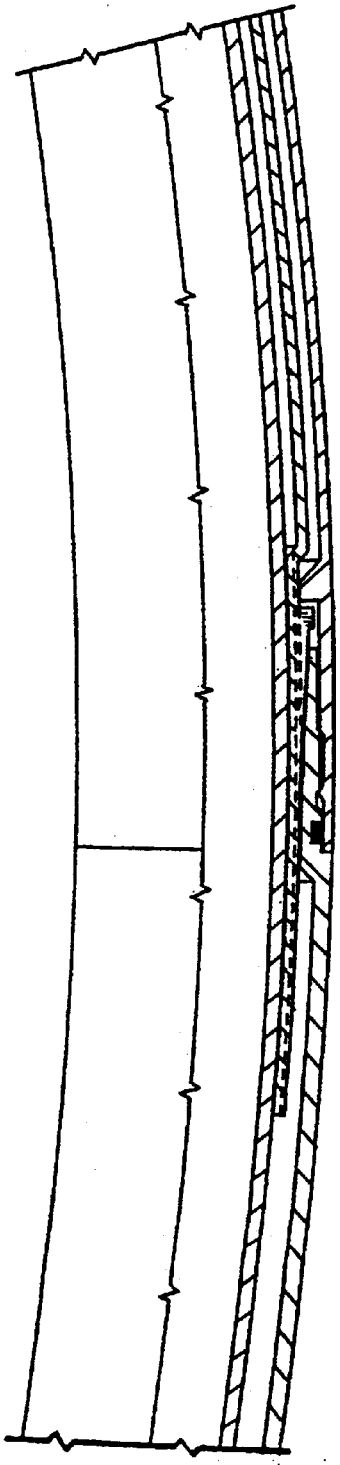
Figure 9D:
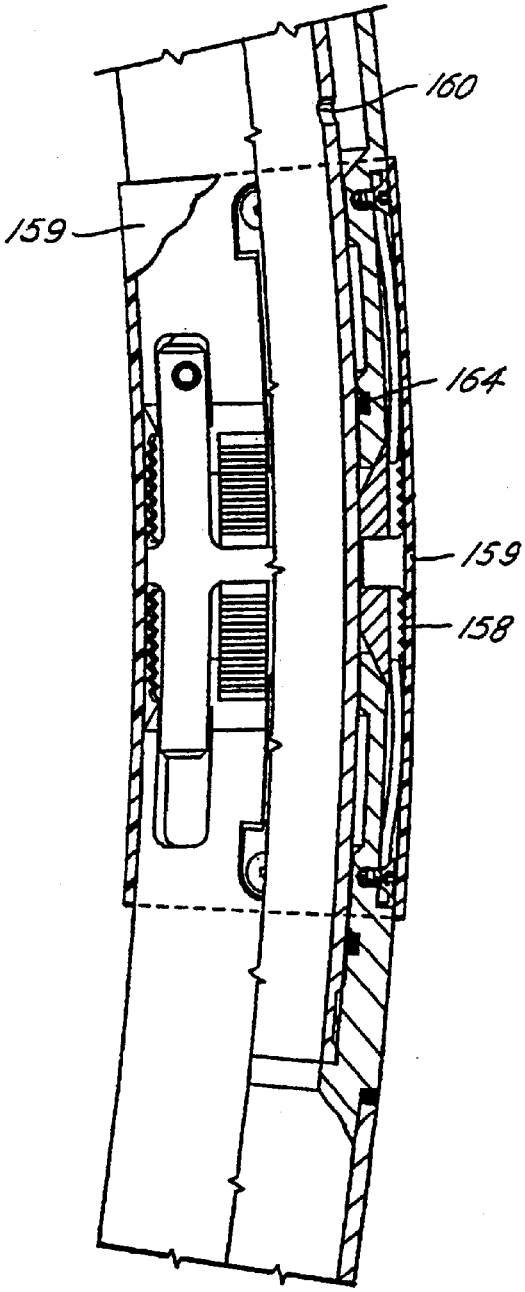

As best seen in FIGS. 7A, 7B and 7C, the annular control valve 72 is longitudinally flexible and the expandable cup seal 78 and the slips 82 are initially in a retracted position whereby the outside diameter of the valve 72 is substantially the same as the outside diameter of the coiled tubing 34 whereby the valve 72 may be inserted through the retrieval system 12. Preferably, the outside of the cup seal 78 is sealed with a thin breakable protective cover such as a heat shrinkable plastic 71, such as sold under the trademark "Teflon" and the slips 82 are initially sealed with a thin breakable protective covering such as room temperature vulcanized rubber 83. The protective covers on the sea 78 and the slips 82 are for protecting these elements from components in the system 12 and also protecting any seals in the system 12 from the valve 72. However, after installation in the well, the protective covers, which are breakable, are broken on expansion of the seal 78 and slips 82. Additionally, a longitudinally movable protective sleeve 81 initially covers and protects the sealing lip 80 as it is passed downwardly through the system 12 and into the well.

Figure 3:
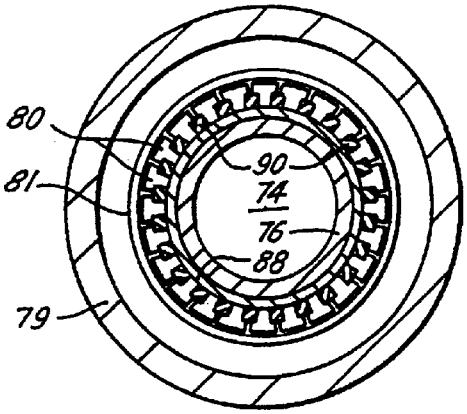
FIG. 3 is a cross-sectional view taken along the line 3—3 of FIG. 1F.

Referring again to FIGS. 1B and 1F, hydraulic piston and cylinder means, such as one or more pistons 84, are movable in cylinders 86 and in communication with hydraulic control conduit 40. The hydraulic control means are connected by a sleeve 88 to a plurality of wedges 90 (FIGS. 1F and 3). Spring biasing means 92 normally biases the piston and cylinder assembly upwardly moving the sleeve 88 and the wedges 90 upwardly to expand the lip seal 80 against the interior of the well conduit 94, as best seen in FIGS. 8A–8E (after setting the slips). Actuation of the hydraulic piston and cylinder assemblies 84 and 86 moves the wedges 90 downwardly and allows the flexible cup seal, which may be rubber, to retract by the action of springs 92 embedded in the flexible cup seal 78. As best seen in FIG. 1F, with the cup seal 78 in the retracted position, lift gas may be injected down the annulus between the annular control valve 72 and the inside of the well conduit 79 to downhole gas lift valves which will be more fully discussed hereinafter. And the annulus provides a much greater gas flow area than conventional annular control valves. However, actuation of the flexible cup 78 to the expanded position (FIG. 8B) packs off and seals the annulus between the valve 72 and the inside of the well conduit 79. And the lip 80 is pressed into an increasing sealing relationship with the inside of the well conduit 79 as the annulus pressure therebelow increases.

Prior to expanding the cup seal 78, the slips 82 are expanded and set. Referring now to FIGS. 1F, 1G and 1H, hydraulic pressure is exerted through the bore 74 of the control valve 72 (as will be more fully explained hereinafter through a pump out plug) and hydraulic fluid is exerted through ports 94 (FIG. 1G) between seals 96 (1G) and 98 (1F) to move element 100 downwardly which (1) moves the protective sleeve 81 downwardly away from the lip 80 of the cup seal 78 and wedges the slips 82 outwardly against the inside wall of the well conduit 79. This sets the slips 82 which are then held in a set position by ratchet 102 on the member 100 acting against ratchet teeth 104 on the housing 76.

The annular control valve 72 includes mechanically actuated releasing means for releasing the control valve 72 from the inside of the well conduit 74. Referring to FIGS. 1H and 1I, the interior housing 76 of the valve 72 is connected through dogs 106 to the coiled tubing 34. A sleeve 108 which holds the dogs 106 in place is connected to the coiled tubing 34 by shear pins 110. The sleeve 108 includes an upwardly facing shoulder 112 which, when jarred by a suitable tool, shears the pins 110, moves the sleeve 108 downwardly, and releases the dogs for allowing the control valve 78 to be lifted and the slips 82 retracted.

Referring now to FIGS. 1J, a longitudinally flexible gas lift valve 120 is shown connected in the coiled tubing 34. In the completion system 10, normally a plurality of such gas lift valves may be provided. The gas lift valve 120 is more fully disclosed in patent application Ser. No. 08/115,623, filed Sep. 3, 1993, entitled "Coiled Tubing Concentric Gas Lift Assembly", and such disclosure is incorporated herein by reference. The gas lift valve 120 has an outside diameter equal to the outside diameter of the coiled tubing 34, and includes a bore 122 for passage of wireline tools and is longitudinally flexible. Generally, the gas lift valve 120 includes a housing 124 which includes one or more ports 126 for the admission of gas in the annulus outside of the housing 12 which is injected into the bore 122 for lifting fluids therein. The valve 120 is normally biased to a closed position by a gas charged compartment 128 acting on one or more bellows 130 and 132. The gas compartment 128 is charged through a dill valve 134. A movable ball 136 and a seat 138 are provided in the housing 124 in communication with the port 126. The gas charged compartment 128 acts to seat the ball 136 on the seat 138 by being connected to a valve element extension 140. For opening the valve 120, lifting gas is injected into the port 126, lifts the ball element 136 and allows the gas to pass into the bore 122.

Referring now to FIGS. 1K, 1L, 1M, 1N and 1O, a zone or isolation packer 150 is shown. The packer 150 is shown in the set position in FIGS. 1K–1O. The packer 150 is shown in its spooled and retracted position in FIGS. 9A–9D. The packer 150 includes a housing 152 connected to the inside of the coiled tubing 34 in which the coiled tubing forms part of the housing for the packer 150. As best seen in FIGS. 9A–9D, the packer 150 in its retracted position has in outside diameter equal to the outside diameter of the coiled tubing 34 and thus does not create any upsets. The packer 150 also includes a bore 154 where passage of wireline tools. The packer 150 includes conventional seat means 156 which may be a conventional wire mesh and resilient seal and also includes slip means 158. The seal means 156 and slip means 158 are adapted to expand and engage against the inside of the well conduit 79. Preferably, the seal means 156 includes a thin breakable protective coating 157 such as a heat shrinkable plastic such as one sold under the trademark "Teflon". And the slips 158 include a thin breakable protective coating 159 such as room temperature vulcanized rubber. The coatings 157 and 159 are to protect the seal 156 and the slips 158 as they are moved into the well and also protect any seals in the system 12. Thereafter, the protective coatings 157 and 159 will be broken when the seal means 156 and the slip means 158 are expanded into a set position.

The packer 150 is a hydraulic set straight pull release packer. The packer 150 is set by pressuring up hydraulic fluid in the bore 154 and applying this pressurizing fluid through ports 160 in FIG. 1N which act between piston seals 162 (FIG. 1O) and seal 164 (FIG. 1). This causes movement of the wedges 166 for extending the slips 158 into engagement with the well conduit 79 and thereafter compressing the seal means 156 into the set position of FIG. 1L. The seal means 156 and the slip means 158 are held in the set position by a ratchet 166 coacting with ratchet teeth 168. As shown in FIGS. 9A–9D, the packer 150 is longitudinally flexible for allowing bending about the longitudinal axis of the well packer 150 for allowing the packer 150 to be spooled on a coiled tubing reel. The piston seals 162 and 164 form pistons movable in their respective cylinders between the seal means 156 and the slip means 158 and are longitudinally flexible for assisting in bending of the packer 150. The packer 150 includes shear pins 170 (FIG. 1K) for releasing the seal means 156 and the slip means 158 on an upward pull of the coiled tubing 34 when it is desired to pull the completion system 10 from the well conduit 79.

Figure 11:
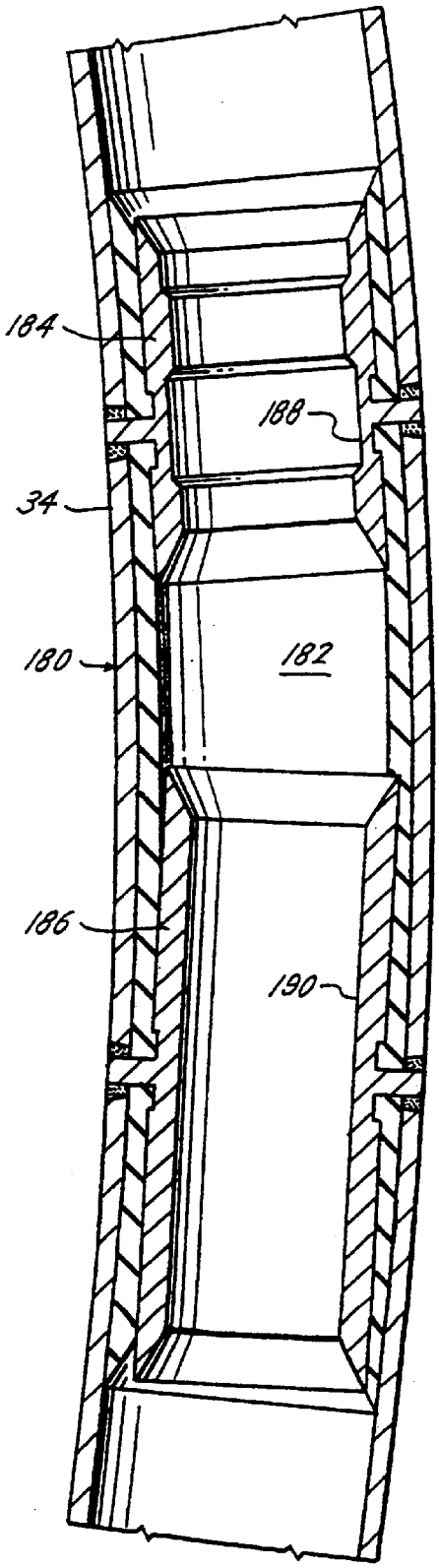
FIG. 11 is an elevational view, in cross section, of the landing nipple of the present invention shown in the spooled position.

Referring now to FIG. 1P, the reference numeral 180 refers to a longitudinally flexible landing nipple positioned in the coiled tubing 34 and having a bore 182 therein for the passage of wireline tools. The landing nipple 180 is shown in a spoolable position in FIG. 11 for storage on a coiled tubing reel. The landing nipple 180 includes first 184 and second 186 separate and spaced tubular members each having a bore extending therethrough for the passage of the wireline tools. The members 184 and 186 are secured to the inside of the coiled tubing 34, such as by welding, and therefore the members 184 and 186 along with a section of the coiled tubing 34 form a housing for the nipple 180. Therefore, the exterior of the landing nipple 180 is flush with the coiled tubing 34. The part 184 may include a no-go shoulder 187 and a locking recess 188 and the second part 186 may include a polished bore 190. Thus, the interior of the landing nipple 180 is similar to that of a conventional D nipple of Camco International Inc. However, by providing separate members 184 and 186 the landing nipple 180 may be made longitudinally flexible and in addition the members 184 and 186 may be separated from each other by variable lengths to accommodate various types of other well tools. In addition, a flexible boot 192 is positioned between each of the members 184 and 186 and the inside of the coiled tubing 34 for providing flexibility and provide barriers at each end of the members 184 and 186 for preventing wireline tool hangups.

Figure 12:
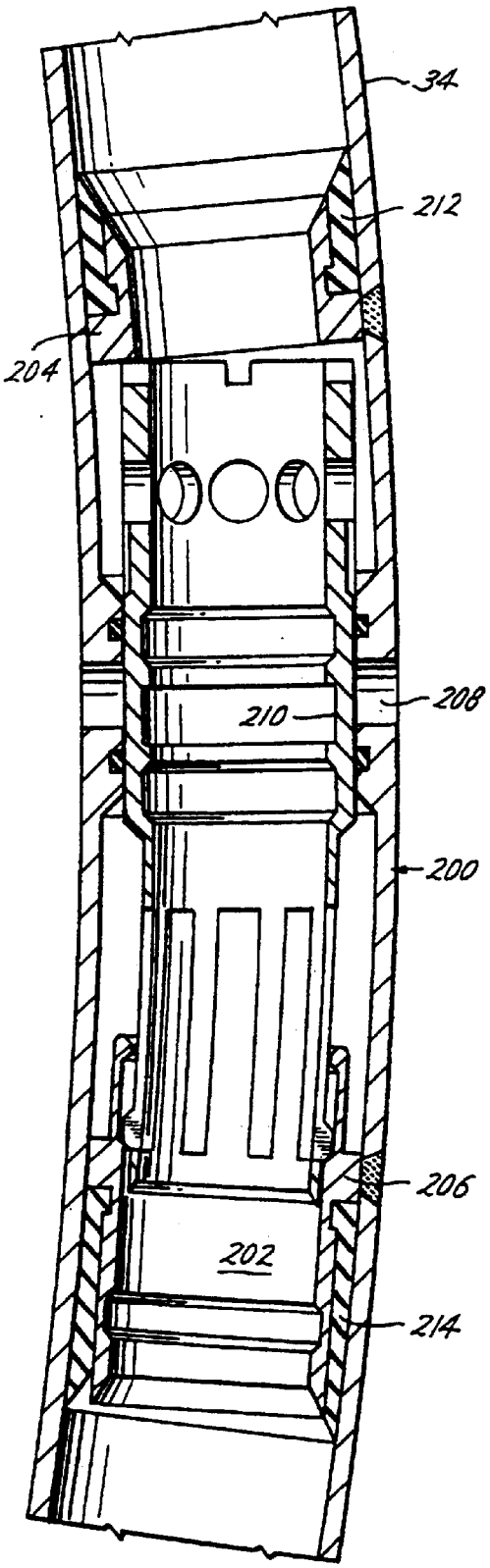
FIG. 12 is an elevational view, in cross section, of the sliding sleeve of the present invention shown in the spooled position.
Figure 13:
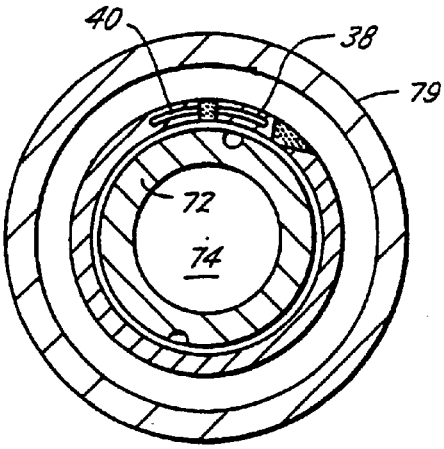
FIG. 13 is a cross-sectional view taken along the line 13—13 of FIG. 8A.
Figure 14:
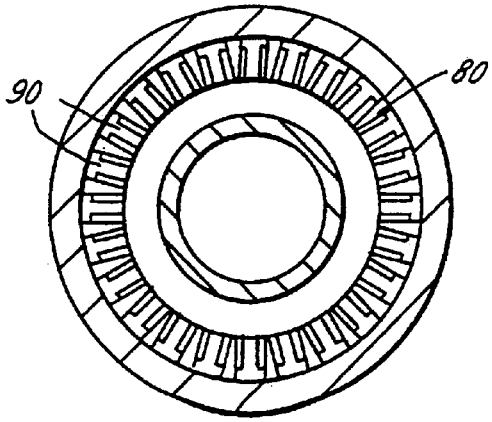
FIG. 14 is a cross-sectional view taken along the line 14—14 of FIG. 8B.

Referring now to FIG. 1Q, a spoolable longitudinally flexible sliding sleeve 200 is best seen positioned in the coiled tubing 34 and having a bore 202 therein for the passage of wireline tools. The sliding sleeve 200 has a housing including a portion of the coiled tubing 34, a first end 204, and a second end 206 connected to the coiled tubing 34. The housing includes one or more ports 208 for communicating fluid between the outside and the inside of the housing. The sliding sleeve 200 is shown in the spooled and flexed position in FIG. 12.

A sliding tubular member 210 is telescopically movable in the housing for opening and closing the ports 208. The ends 204 and 206 are positioned on opposite ends of the tubular member 210. A flexible boot 212 and 214 is positioned between each of the ends 204 and 206, respectively, and the inside of the coiled tubing 34 whereby the sliding sleeve 200 is longitudinally flexible for allowing the sliding sleeve 200 to be spooled on a coiled tubing reel.

Figure 10A:
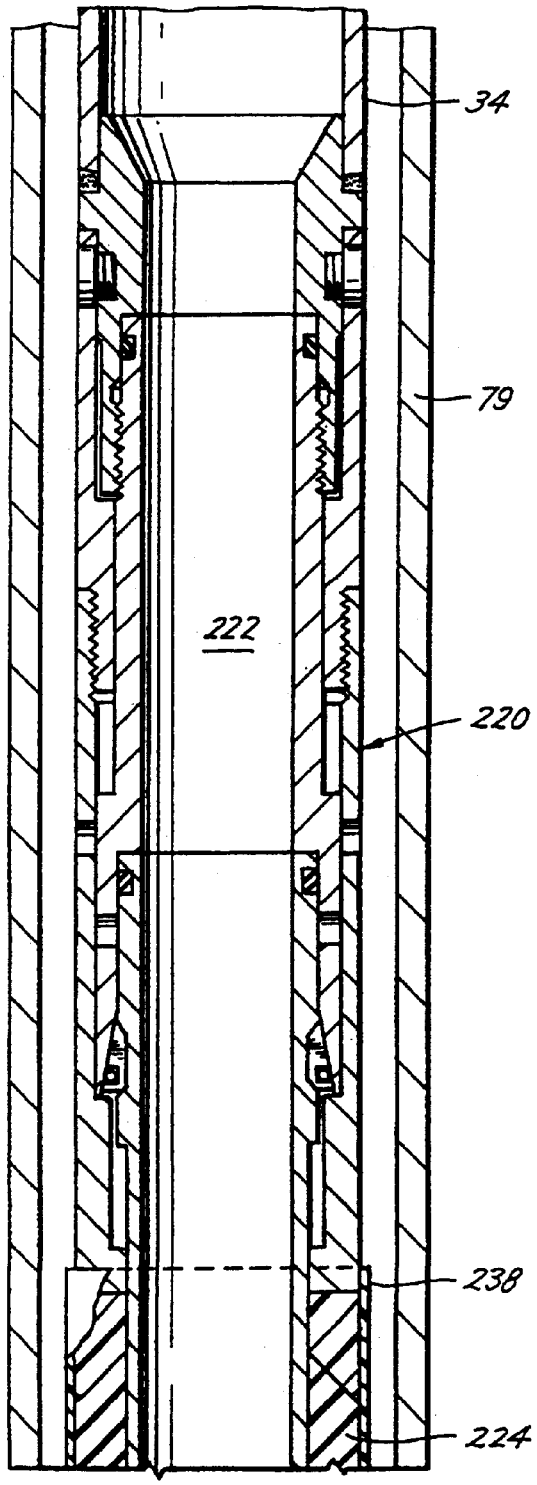
FIGS. 10A, 10B and 10C are continuations of each other and form and elevational view, in cross section of the production packer of the present invention in the retracted position.
Figure 10B:
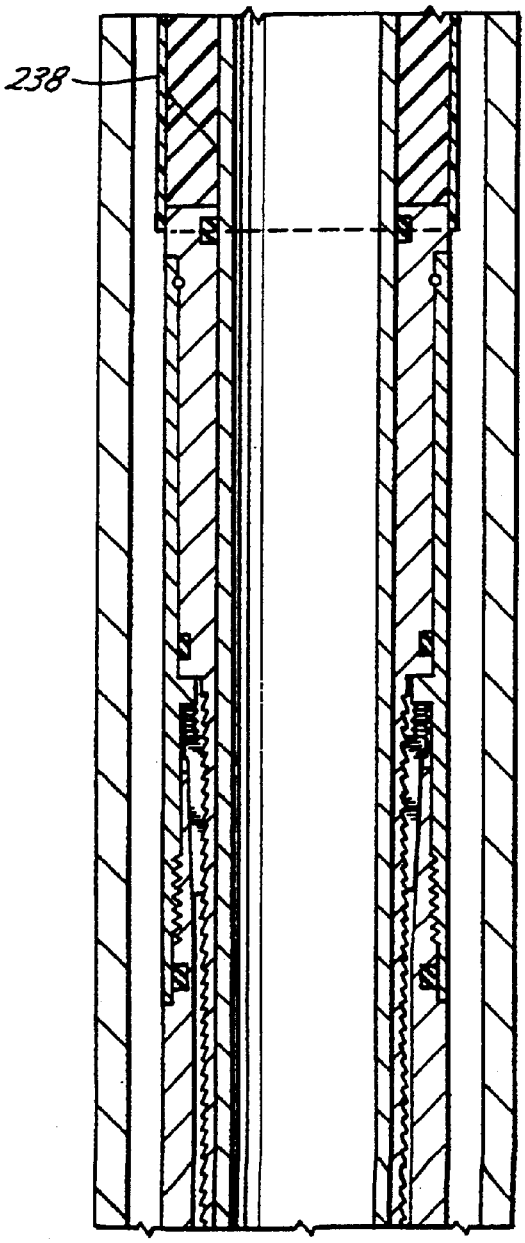
Figure 10C:
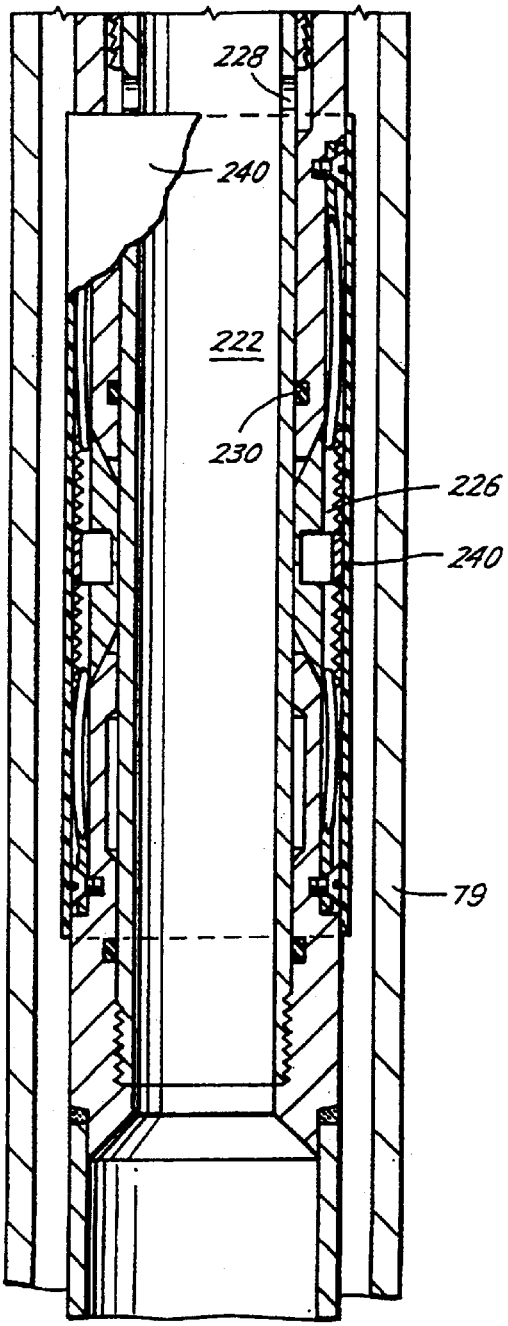

Referring now to FIGS. 1R, 1S and 1T, a production packer 220 is illustrated in the set position and is shown in the set position in FIGS. 10A, 10B and 10C. The production packer 220 includes a bore 222 therethrough for the passage of wireline tools and the packer, in the retracted position, as best seen in FIGS. 10A, 10C includes an outside diameter flush with the outside diameter of the coiled tubing 34. While the packer 220 is positioned in the coiled tubing 34, it is connected adjacent the lower end of the completion system 10 and therefore is not required to be longitudinally flexible when the completion system 10 is rolled upon a coiled tubing reel. However, it is important that the packer 220 have a flush OD for passing through the injector head, packoff and blowout preventer and yet have a bore size for passage of other wireline tools. The packer 220 is similar in structure and operation to the isolation packer 150 previously described and is hydraulically set and mechanically released with a straight pull. Thus, the packer 220 includes packing sealing means 224 and slips 226. The packer 220 is set by pressuring up fluid in the bore 222 and applying it through a port 228 to act across seals 230 and 232 to actuate the slip means 226 and the seal means 224. The packer 220 is then held in the set position by the action of a ratchet 234 acting against teeth 236. A thin breakable protective coating 238, such as a heat shrinkable plastic, such as sold under the trademark "Teflon", is applied around the seal 224. And a thin breakable protective coating 240, such as a room temperature vulcanized rubber, is applied around the slip means 226.

Referring now to FIG. 1U, a pump out plug 250 is connected to the lower end of the coiled tubing 34 and includes a bore 252 therethrough for the passage of wireline tools. The pump out plug 250 includes an outside diameter substantially equal to the outside diameter of the coiled tubing 34, but the pump out plug 250 is used to pressurize the bore of the tubing completion system 10 by dropping a ball 254 onto a removable seat 256. In addition, the pump out plug 250 may include a no-go shoulder 258 and a locking recess 260 for landing additional well tools therein.

Figure 5:
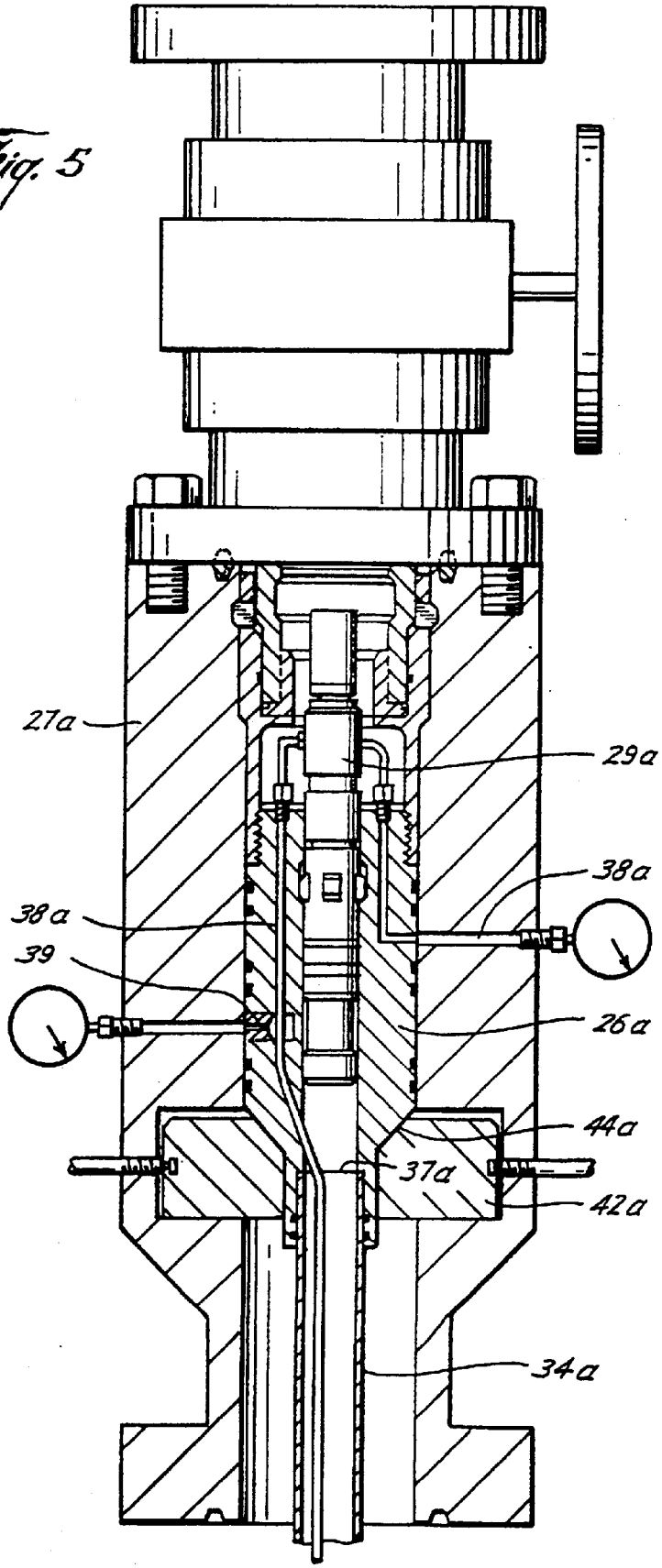
FIG. 5 is a schematic elevational view, partly in cross section, of another embodiment of a control line hanger.

Referring now to FIG. 5, another embodiment of a control line hanger and control line housing is shown as a variation of the embodiment illustrated in FIG. 1A. Like parts to that shown in FIG. 1A are similarly numbered with the addition of the suffix "a". In FIG. 1A, the hydraulic control conduits 38 and 40 were illustrated as being within the walls of the coiled tubing 34. However, in some installations the control conduit or conduits may be positioned on the inside of the coiled tubing 34a. Such an internal type hydraulic control conduit would interfere with the operation of the retrieval system 12 which will be more fully discussed hereinafter which grips the inside of the top 37a of the coiled tubing 34a. Thus, a control line hanger 26a is positioned in a control line hanger housing 27a in which one or more hydraulic control conduits, here shown as a single hydraulic conduit 38a extends down the interior of the coiled tubing 349. The control line hanger 26a holds the control line 38a in tension, such as an inverted U configuration, and the control conduit 38a is shown exiting the housing 27a. The hanger 26a includes a cutting means 39 which, when actuated, such as hydraulically cuts the control conduit 38a which is under tension, and thus conduit 38a springs back into the interior of the coiled tubing 34a and below the top 37a. This clears the inside of the top of the coiled tubing 34a for retrieval operations. Additionally, the control line housing 27a includes movable centralizing guides 42a having guide surfaces 44a for moving inwardly against the outside of the top 37a of the coiled tubing 34a for centralizing the coiled tubing 34a for insertion of the retrieval system 12.

Figure 16A:
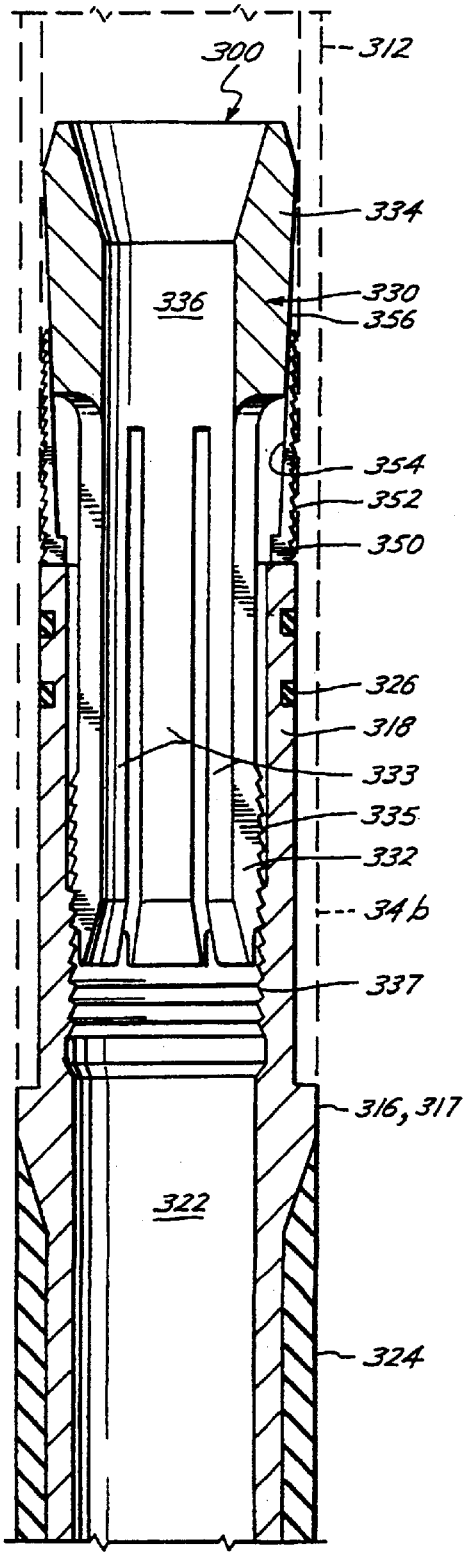
FIGS. 16A and 16B are continuations of each other and illustrate a suitable internal connector for retrieving the coiled tubing completion system of the present invention.
Figure 16B:
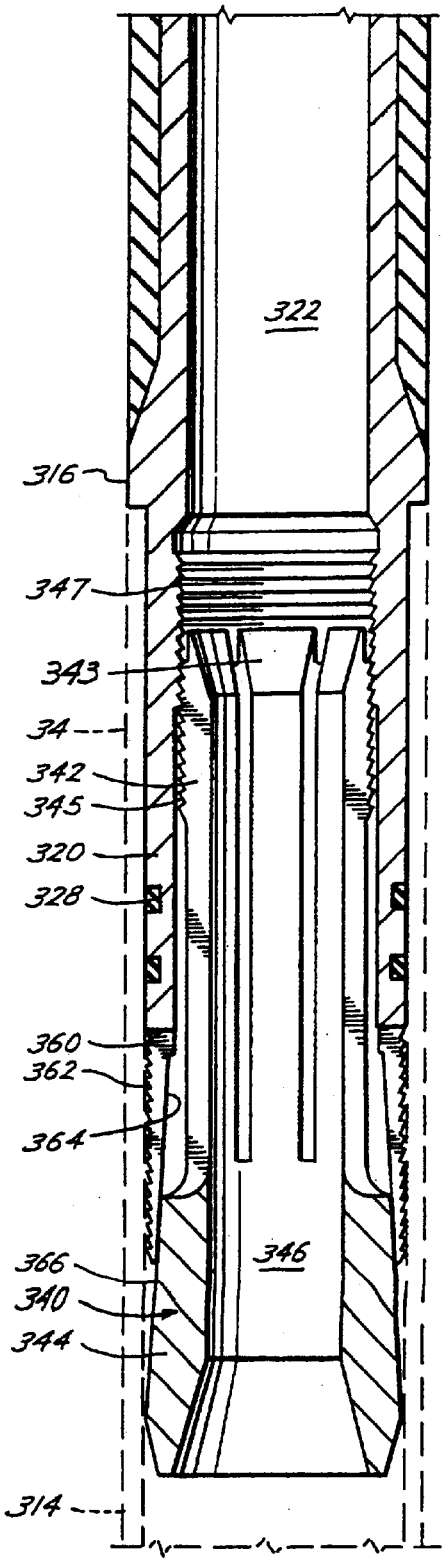

Referring now to FIGS. 15, 16A and 16B, a system for retrieving the spoolable completion system 10 of the present invention is best seen. Because the tubing completion system 10 has a flush and constant outside diameter without any upsets and is flexible and spoolable, the retrieval system 12 is able to retrieve the tubing system 10 through the injector 20, the blowout preventer 22 and the wellhead 24 and any other packoffs even if the well is live without needing to pressure balance the well as the completion system 10 is removed. The retrieval system 12 includes the real 16, and a second coiled tubing 34b positioned on the reel 16 having at its end a longitudinally actuated internal gripping connector 300 which is longitudinally flexible and has an outside diameter equal to the outside diameter of the coiled tubing so that it may be inserted through the injector 20, the blowout preventer 22 and the wellhead 24 and into the upper end 37 or 37a of the coiled tubing 34 or 34a for gripping and removing the completion system 10 from the well. The internal connector 300 may be of the type disclosed in patent application Ser. No. 08/013,385, filed Feb. 4, 1993, entitled "Method And Apparatus For Internally Connecting To Coiled Tubing", now U.S. Pat. No. 5,306,050 which is incorporated herein by reference. Generally, the connector 300, as shown in FIGS. 16A and 16B, is initially positioned, but unset, in the inside of one end of the coiled tubing 34b and 34, shown in dotted outline. The connector 300 includes a metal body 316 having a first end 318 and a second end 320 and a bore 322 therethrough for the passage of fluids. The body 316 has an outside diameter 324 of a size no greater than the outside diameter of the coiled tubing 34b and 34. Therefore, the body 316 does not upset or protrude past the outside diameter of the coiled tubing 34b and 34 and thus passes freely through coiled tubing injector chains round goosenecks, and on to the coiled tubing reel 16. The first end 318 of the body 316 and the second end 320 of the body 316 have an outside diameter substantially equal to the inside diameter of the first and second coiled tubing 34b and 34, respectively.

Seal means, such as O-ring seals 326 and 328 are provided on the first end 318 of the body 316 and also on the second end 320 of the body 316, respectively, for sealing between the first end 318 and the inside of the first coiled tubing 34b and for sealing between the second end 320 of the body 316 and the inside of the second coiled tubing 34, respectively.

In the preferred embodiment, the outside diameter of the metal part of the body 316 is substantially equal to the inside diameter of the coiled tubing 12 and 14 which allows the body 316 to be thin and flexible and spoolable. A plastic coating 324, such as sold under the trademark "Halar 200" is bonded to the exterior of the body 316. The coating 324 has an outside diameter substantially equal to the outside diameter of the coiled tubing 34b and 34.

A first mandrel 330 has a first end 332 and a second end 334 and is provided with a bore 336 therethrough in communication with the bore 322. The first end 332 of the first mandrel 330 includes a plurality of collet fingers 333 and coacting ratchet means on the fingers and the inside of the first end 318 of the body 316. Thus, the collet fingers 333 include a plurality of ratchet teeth 335 which coact with ratchet teeth 337 on the inside of the body 316. Thus, the mandrel 330 may ratchet into the bore 322 of the body 316 but cannot longitudinally move out of the body 316. A second mandrel 340 includes a first end 342 and a second end 344 with a bore 346 therebetween in communication with the bore 322. The first end 342 of the mandrel 340 includes a plurality of collet fingers 343. Coacting ratchet means are provided on the outside of the fingers 343 and on the inside of the second end 320 of the body 316. Thus, ratchet teeth 345 are provided on the exterior of the collet fingers 343 and teeth 347 on the inside of the body 316. Preferably, the teeth 345 and 347 are coacting threads. Therefore, the mandrels 330 and 340 may longitudinally move towards the body 316, but are prevented from moving away from the body 316 by the coacting ratchet teeth.

First slip means 350 abuts the first end 318 of the body 316 and is engagable with the outside of the first mandrel 330. The slip means 350 includes a plurality of outwardly directed teeth 352 which are preferably directed towards the fist end 318 of the body 316 and towards the end of the first coiled tubing 34b. A second slip means 360 is provided abutting the second end 320 of the body 316 and is engagable with the outside of the second mandrel 340. The slip means 360 includes a plurality of outwardly directed teeth 362 directed towards the end 320 of the body 316 and towards the end of the coiled tubing 314. Thus, it is noted that when the slips 350 and 360 are inserted into the coiled tubings 34b and 34, respectively, the slip means 350 and 360 travels into the ends of the coiled tubings 34b and 34, but not out of the ends of the coiled tubing 312 and 34.

Coacting wedge surfaces are provided on the inside of the first slip means 350 and on the outside of the first mandrel 330 such as wedge surface 354 on the slip means 350 and wedge surface 356 on the outside of the mandrel 330. The wedge surfaces 354 and 356 wedge the first slip means 350 into the inside of the first coiled tubing 34b when the body 316 is longitudinally pulled out of the end of the coiled tubing 34b thereby pulling the mandrel 330 by the coacting engaging ratchet teeth 335 and 337. Similarly second coacting wedge surfaces are provided on the inside of the second slip means 360 and the outside of the second mandrel 340 such as wedge surface 364 on the inside of slip means 360 and wedge surface 366 on the outside of mandrel 340 for wedging the second slip means 360 into the inside of the second coiled tubing 34 when the body is longitudinally pulled out of the second coiled tubing 34.

In use, the connector 300 is made up as best seen in FIGS. 16A and 16B. A longitudinal pull is exerted on the coiled tubing 34b in a direction to withdraw the body 300 from the ends of the coiled tubing 34b and 34. The longitudinal force is alternated to provide a compressive force to allow the connector 300 to longitudinally ratchet together to securely grip the insides of the coiled tubings 34b and 34. After securing the connector 300 to the coiled tubings, the spoolable completion system 10 may be removed (after the packers 150 and 220 are unseated) and withdrawn from the well.

The present invention, therefore, is well adapted to carry out the objects and attain the ends and advantages mentioned as well as others inherent therein. While a presently preferred embodiment of the invention has been given for the purpose of disclosure, numerous changes in the details of construction, will be readily apparent to those skilled in the art and which are encompassed within the spirit of the invention and the scope of the appended claims.

What is claimed is:

1. A spoolable flexible hydraulic controlled coiled tubing safety valve positioned in a coiled tubing comprising, a housing secured to the inside of the coiled tubing, said housing having a passageway extending therethrough for the passage of wireline tools when the valve is open, a valve closure member in the passageway moving between open and closed positions for controlling fluid flow through the passageway, a flow tube telescopically moving in the housing for controlling the movement of the valve closure member, hydraulic piston and cylinder fluid actuating means positioned above and connected to the flow tube, biasing spring means positioned about the flow tube and connected thereto for moving the valve to a closed position, and said spring means and said flow tube are longitudinally flexible for allowing bending about the longitudinal axis of the valve for allowing the valve to be spooled on a coiled tubing reel.

2. The valve of claim 1 including, a down stop connected to the inside of the coiled tubing for limiting the movement of the flow tube.

3. The valve of claim 1 wherein the coiled tubing includes a wall and including, a hydraulic control line connected to the hydraulic piston and cylinder actuating means positioned in the wall of the coiled tubing.

4. The valve of claim 1 wherein the housing includes first and second separated parts each secured to the inside of the coiled tubing.

5. The valve of claim 1 wherein the flow tube includes a plurality of separated longitudinally extending ribs for providing longitudinal flexibility.

*6. A spoolable flexible coiled tubing safety valve configured for use with a coiled tubing completion system, comprising:*

*a tubular member having a passageway extending therethrough,*

*a valve closure member positioned in the passageway,*

*a flow tube positioned in the passageway,*

*a flow tube actuator connected to the flow tube,*

*and a biasing element connected to said flow tube,*

*wherein said coiled tubing safety valve is sufficiently flexible to be spooled on a coiled tubing reel.*

* * * * *